(12) United States Patent
Sugiyama et al.

(10) Patent No.: US 7,986,131 B2
(45) Date of Patent: Jul. 26, 2011

(54) BOOSTER POWER SUPPLY CIRCUIT AND CONTROL METHOD THEREFOR AND DRIVER IC

(75) Inventors: Akio Sugiyama, Kanagawa (JP); Kiyoshi Miyazaki, Kanagawa (JP); Takashi Tahata, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1043 days.

(21) Appl. No.: 11/806,423

(22) Filed: May 31, 2007

(65) Prior Publication Data

US 2007/0279950 A1 Dec. 6, 2007

(30) Foreign Application Priority Data

Jun. 1, 2006 (JP) ................................. 2006-153681

(51) Int. Cl.
*H02J 7/00* (2006.01)
(52) U.S. Cl. ........................................ 320/166; 320/107

(58) Field of Classification Search .......... 320/166–167; 327/536, 589; 323/222
See application file for complete search history.

(56) References Cited

U.S. PATENT DOCUMENTS 6,960,955 B2 * 11/2005 Nonaka .......................... 327/536
2002/0008567 A1 * 1/2002 Henry ........................... 327/536

FOREIGN PATENT DOCUMENTS

| JP | 5-55737 | 7/1993 |
| JP | 06-225546 | 8/1994 |
| JP | 07-44134 | 2/1995 |

* cited by examiner

*Primary Examiner* — Edward Tso
*Assistant Examiner* — Samuel Berhanu
(74) *Attorney, Agent, or Firm* — McGinn Intellectual Property Law Group, PLLC

(57) ABSTRACT

A booster power supply circuit includes a booster boosting an input voltage to output an boosted voltage for applying said boosted voltage to a first smoothing capacitor and a controller controlling a transfer destination and an amount of transfer of a charge in the first smoothing capacitor at a transition from an operation mode to a standby mode.

20 Claims, 17 Drawing Sheets

OPERATION MODE

RELATED ART

OPERATION MODE

STANDBY MODE

BOOSTER POWER SUPPLY CIRCUIT AND CONTROL METHOD THEREFOR AND DRIVER IC

BACKGROUND OF THE INVENTION

1. Field of the Invention

The present invention relates to a booster power supply circuit, a control method therefor and a driver IC, and particularly to a booster power supply circuit having a standby mode, a control method therefor and a driver IC.

2. Description of Related Art

In semiconductor integrated circuit technology, power supply voltage and power consumption have been attempted to be reduced. In a driver IC for driving LCD (Liquid Crystal Display) or the like, the power supply voltage has been reduced. On the other hand, a voltage required to drive LCD or the like is determined in advance according to pixel material, and a high voltage capable of outputting high brightness is often required so as to improve display quality. Therefore, the driver IC includes a built-in booster and a voltage for driving LCD is supplied from the booster.

There are many ICs including a LCD driver IC supplied with an external power supply for generating an internal voltage by a booster. An output voltage generated by the booster is usually connected with a smoothing capacitor to attempt to stable an output.

A driver IC having such booster built-in stops the operation of the booster while not needed to display in order to reduce power consumption. As described in the foregoing, the state not supplying a driving voltage to LCD and retaining to be low power consumption state is referred to as a standby mode. In the driver IC, to stop the operation of the booster while inputting an external power supply, which means to enter the standby mode, charge in a smoothing capacitor is discharged.

As a method to discharge the charge in the smoothing capacitor, there are for example; a method to simply discharge the charge accumulated in the smoothing capacitor to ground as disclosed by Edogawa in Japanese Unexamined Utility Model Publication No. 5-55737, a method to discharge by connecting to an external power supply, which is an input power supply of the booster, and discharging from the external power supply as disclosed by Tatsumi in Japanese Unexamined Patent Application Publication No. 6-225546 and by Morishita et al. in Japanese Unexamined Patent Application Publication No. 7-44134.

Circuit diagrams of a booster power supply circuit 10 having almost same configuration as the configuration of a booster power supply circuit disclosed by Edogawa are shown in FIGS. 17 and 18. FIG. 17 shows the state of the booster power supply circuit 10 in a normal operation mode while FIG. 18 shows the state of the booster power supply circuit 10 in the standby mode. As shown in FIG. 17, the booster power supply circuit 10 includes a booster 11 and controller 12 or the like. A first smoothing capacitor C1 for smoothing an external power supply VCC is provided to an input side of the booster 11. Further, a second smoothing capacitor C2 for smoothing a boosted voltage Vout is provided to an output side of the booster 11. Additionally, the second smoothing capacitor C2 is connected to a resistance R1 via a first switching device SW1. The resistance R1 is a resistance for limiting current.

The booster power supply circuit 10 includes a controller 12. The controller 12 outputs a STBYB signal for switching between the standby mode and operation mode. The booster power supply circuit 10 becomes the operation mode when the STBYB signal is "H" and the first switching device SW1 becomes OFF state as in FIG. 17. At this time, the booster 11 performs a normal boosting operation. On the other hand, the booster power supply circuit 10 becomes the standby mode when the STBYB signal is "L" and the first switching device SW1 becomes ON state as in FIG. 18. At this time, the booster 11 stops the boosting operation.

FIG. 19 is a view showing the configuration of a conventional booster power supply circuit. In the operation mode, the first switching device SW1 is OFF state and the second smoothing capacitor C2 functions as a capacity to stable a voltage of the boosted voltage Vout. On the other hand in the standby mode, the booster 11 stops the boosting operation with the first switching device SW1 being ON state, charge in the second smoothing capacitor C2 is discharged to ground.

As described in the foregoing, in the booster power supply circuit 10 disclosed by Edogawa, all the charge in the second smoothing capacitor C2 is discharged to ground in the standby mode. It is true that keep applying a DC potential to LCD panel is a problem in the lifetime of the panel and discharging to ground is effective. However, to discharge the charge in the second smoothing capacitor C2 when using the booster power supply circuit 10 for a power supply or the like inside the driver IC, a large amount of charge must be supplied in a transition from the standby mode to operation mode, thereby increasing power consumption.

To overcome this problem, a booster power supply circuit 20 disclosed by Tatsumi or Morishita et al. is suggested. Circuit diagrams of a booster power supply circuit 20 having almost same configuration as the configuration of a booster power supply circuit disclosed by Tatsumi or Morishita et al. are shown in FIGS. 20 and 21. FIG. 20 shows the state of the booster power supply circuit 20 when power is turned on and in the standby mode. Further, FIG. 21 shows the state of the booster power supply circuit 20 in a normal operation mode. As shown in FIG. 20, the booster power supply circuit 20 includes a booster 21 and a controller 22 or the like. A first smoothing capacitor C1 for smoothing an external power supply VCC is provided to an input side of the booster 22. Further, a second smoothing capacitor C2 for smoothing a boosted voltage Vout is provided to an output side of the booster 21. A first switching device SW1 is provided between the booster 21 and second smoothing capacitor C2. Further, the first smoothing capacitor C1 and second smoothing capacitor C2 are connected via a second switching device SW2.

Further, the booster power supply circuit 20 includes a controller 22. The controller 22 outputs a STBYB signal for switching between the standby mode and operation mode. The booster power supply circuit 20 becomes the standby mode when the STBYB signal is "L". At this time as shown in FIG. 20, the first switching device SW1 becomes OFF state, second switching device SW2 becomes ON state and the booster 21 stops the boosting operation. On the other hand, when the STBYB signal is "H", the booster power supply circuit 20 becomes the operation mode. At this time as shown in FIG. 21, the first switching device SW1 becomes ON state, the second switching device SW2 becomes OFF state and the booster 21 carries out the boosting operation.

FIG. 22 shows an operation output waveform of the booster power supply circuit 20. In the operation mode (where STBYB="H"), the first switching device SW1 is ON state, second switching device SW2 is OFF and the second smoothing capacitor C2 functions as a capacity to stable a voltage of the boosted voltage Vout. On the other hand in the standby mode (where STBYB="L"), the booster 21 stops the boosting operation, the first switching device SW1 is OFF and second switching device SW2 is ON state so as to discharge the charge in the second smoothing capacitor C2 to the external power supply VCC.

In the booster power supply circuit 20 disclosed by Tatsumi or Morishita et al., a path is provided for connecting to an input terminal from the second smoothing capacitor C2 towards the external power supply VCC. In the standby mode, the charge in the second smoothing capacitor C2 is discharged to the external power supply VCC. Therefore in the standby mode, the charge is charged to a potential of the external power supply VCC in the second smoothing capacitor C2. Accordingly when changing again from the standby mode to the operation mode, the booster 21 boosts from the potential of the external power supply VCC to the output potential Vout. Thus the wasteful transfer of the charge can be reduced to the minimum and also the time till the completion of the boosting operation can be reduced.

However in a case the external power supply VCC does not have enough capability to discharge the charge in the second smoothing capacitor C2, the potential of the external power supply VCC increases as shown in FIG. 22. Therefore, it has now been discovered that a voltage more than defined value is applied to the external power supply VCC and input part of the booster 21.

Thus, a booster power supply circuit having a high reliability that suppresses power consumption with the minimum transfer of the charge and prevents a high voltage exceeding a withstand pressure of the input part of the booster from being applied even when absorbing capability of an input of the booster is small.

SUMMARY

According to an aspect of the present invention, there is provided a booster power supply circuit that includes a booster boosting an input voltage to output an boosted voltage for applying said boosted voltage to a first smoothing capacitor and a controller controlling a transfer destination and an amount of transfer of a charge in the first smoothing capacitor at a transition from an operation mode to a standby mode. By having such configuration, wasteful transfer of the charge can be reduced to the minimum. Further as the charge is not transferred wastefully, the time till the completion of a boosting operation can be reduced and thereby reducing power consumption. Further, as a high voltage can be prevented from being applied to an input part of the booster of the like, it is possible to provide a booster power supply circuit having high reliability.

According to another aspect of the present invention, there is provided a method that includes applying a voltage outputted from an external power supply to a booster in an operation mode, outputting a boosted voltage from said booster while smoothing said boosted voltage by a smoothing capacitor and controlling a transfer destination and an amount of transfer of a charge in the smoothing capacitor at a switch from the operation mode to a standby mode. Thus, wasteful transfer of the charge can be reduced to the minimum. Further as the charge is not transferred wastefully, the time till the completion of a boosting operation can be reduced and thereby reducing power consumption. Further, as a high voltage can be prevented from being applied to an input part of the booster of the like, it is possible to provide a booster power supply circuit having high reliability.

The present invention provides a booster power supply circuit having a high reliability that suppresses the power consumption by minimizing wasteful transfer of the charge and prevents a high voltage exceeding a withstand pressure of an input part of the booster or the like from being applied even when absorbing capability of an input power supply of the booster is small.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
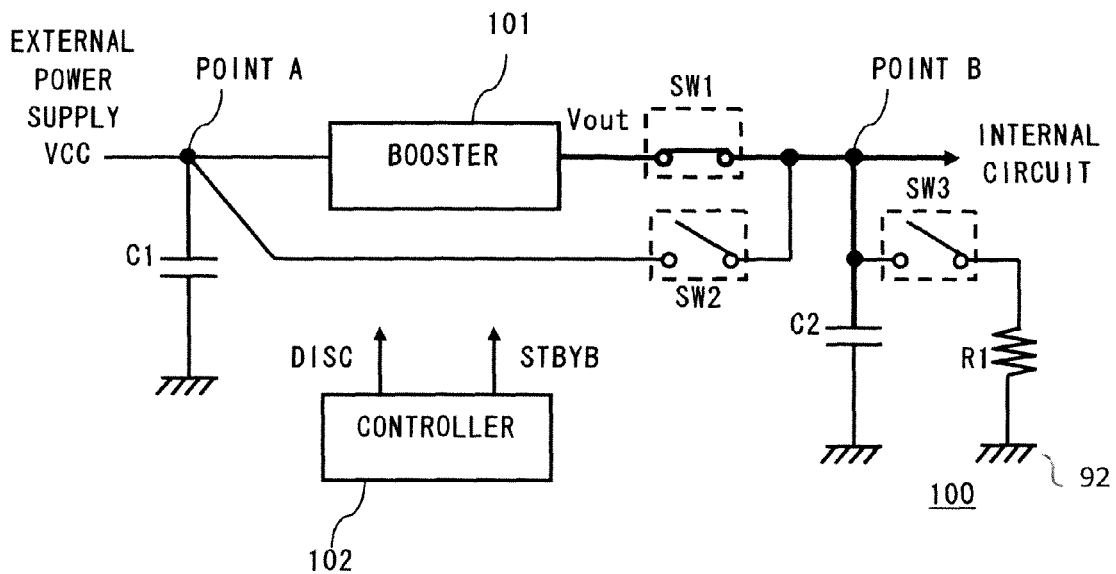
FIG. 1 is a view showing a state of switching device in an operation mode of a booster power supply circuit according to a first embodiment of the present invention.
Figure 2:
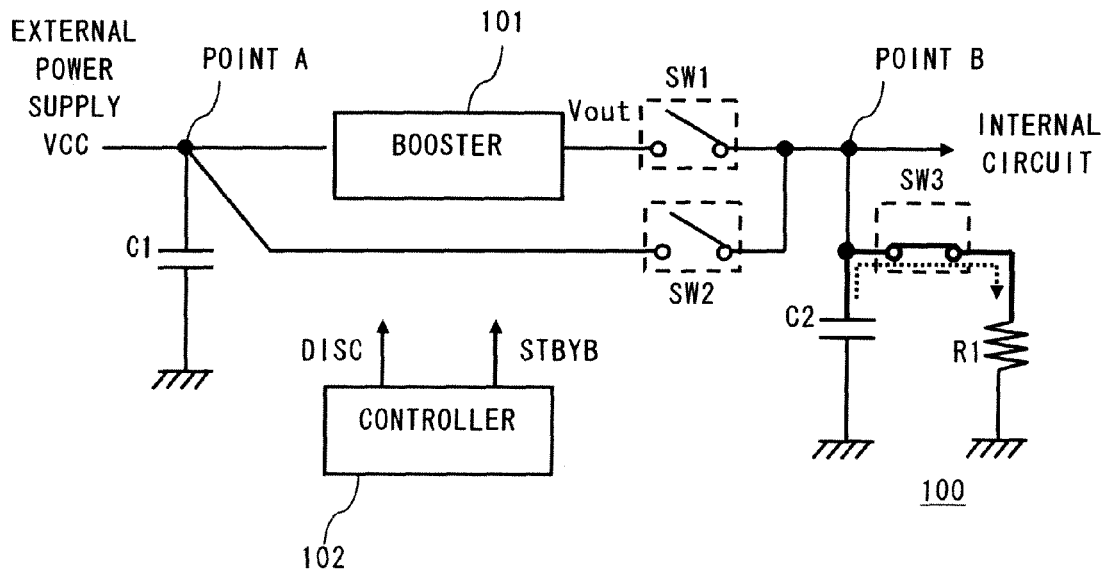
FIG. 2 is a view showing a state of a switching device immediately after changing from the operation mode to a standby mode of the booster power supply circuit according to the first embodiment of the present invention.

A booster power supply circuit 100 according to a first embodiment of the present invention is described hereinafter in detail with reference to FIGS. 1 and 2. The booster power supply 100 of the present invention has an operation mode for performing a normal boosting operation and a standby mode to be in a lower power consumption state. FIGS. 1 and 2 are views showing the configuration of the booster power supply 100 of this embodiment. FIG. 1 is a view showing a state of a switching device in the operation mode of the booster power supply circuit 100. Further, FIG. 2 is a view showing a state of the switching device immediately after changing from the operation mode to the standby mode of the booster power supply circuit 100 according to this embodiment. As shown in FIGS. 1 and 2, the booster power supply circuit 100 includes a booster 101, controller 102 and an external power supply VCC or the like.

The booster 101 boosts an input voltage input from the external power supply VCC to a desired voltage value of an output voltage Vout. On an input side of the booster 101, a first smoothing capacitor C1 is provided for smoothing an input voltage. A contact between an electrode of the first smoothing capacitor C1 and the input side of the booster 101 is referred to as a point A. Further, another electrode of the first smoothing capacitor C1 is connected to a ground potential.

A second smoothing capacitor C2 is provided on an output side of the booster 101 via a first switching device (switching element) SW1. The second smoothing capacitor C2 smooths an output voltage Vout. A contact between an electrode of the second smoothing capacitor C2 and the output side of the booster 101 is referred to as a point B. Further, another electrode of the second smoothing capacitor C2 is connected to a ground potential. Additionally, the first smoothing capacitor C1 and second smoothing capacitor C2 are connected via a second switching device SW2. Another electrode of the second capacitor C2 is connected to the ground potential (or power source or supply at the ground potential) 92 via a third switching device SW3 and a current limiting resistance device (resistance element) R1.

The controller 102 outputs a STBYB signal (standby mode control signal) and a DISC signal (discharge control signal). The STBYB signal is a signal for switching between the abovementioned operation mode and standby mode. The booster power supply circuit 100 becomes the operation mode when the STBYB signal is "H" and becomes the standby mode when "L". Further, the DISC signal is a signal for controlling the second switching device SW2 and third switching device SW3 so as to discharge charge accumulated in the second smoothing capacitor C2 to ground.

Figure 3:
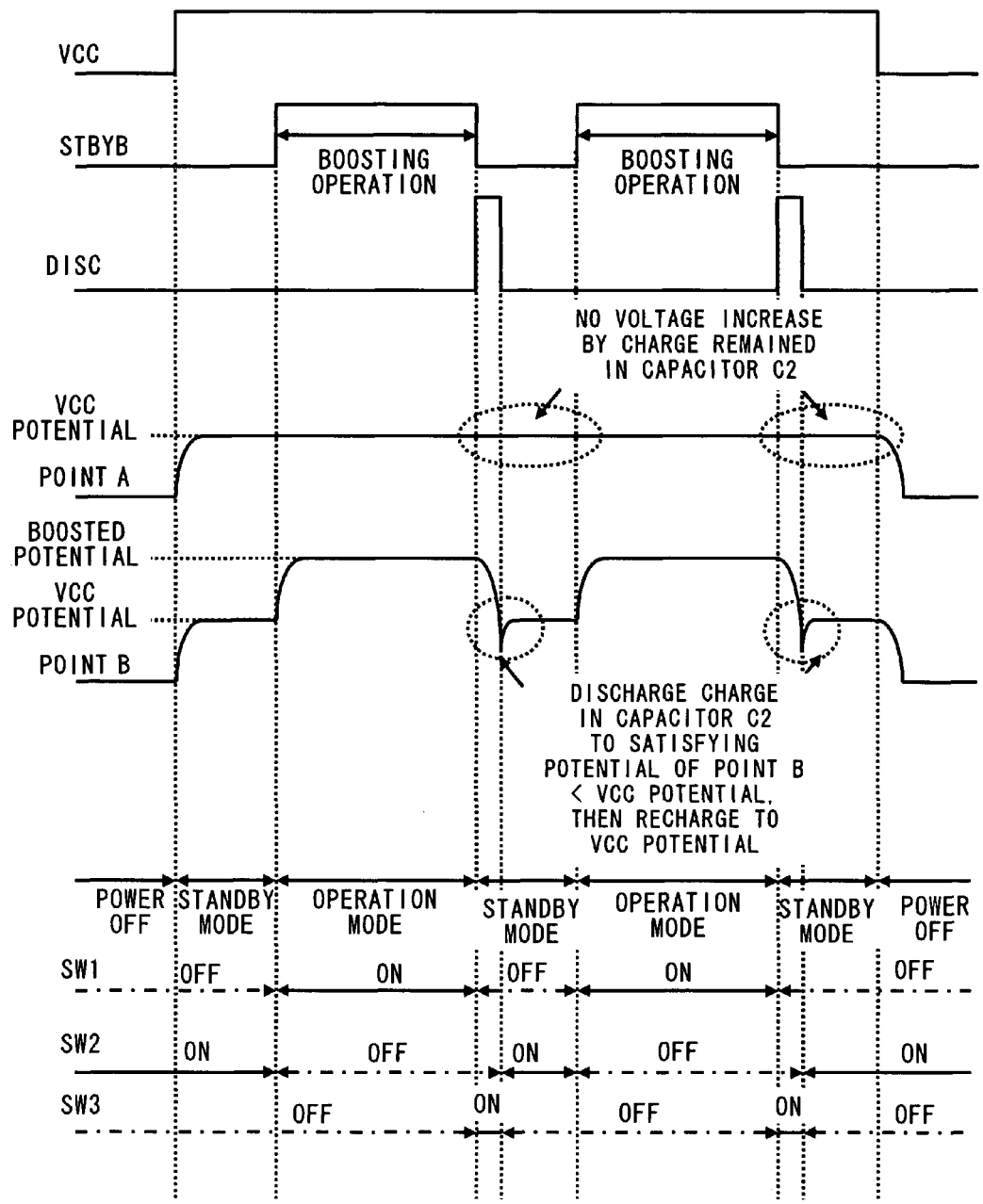
FIG. 3 is a view explaining an operation of the booster power supply circuit according to the first embodiment of the present invention.

A control method of the booster power supply circuit 100 is described hereinafter in detail with reference to FIG. 3. FIG. 3 is a view showing an operation output waveform of the booster power supply circuit 100 according to this embodiment. As shown in FIG. 3, while the power is OFF to be ON, when the input voltage is supplied from the external power supply VCC, a potential of the point A becomes a VCC potential of the input voltage. At this time, as the STBYB signal is "L", the booster power supply circuit 100 is in standby mode. In the standby mode immediately after the power becomes ON state, the first switching device SW1 is OFF state, the second switching device SW2 is ON state and the third switching device SW3 is OFF state. Moreover in the standby mode, since the booster 101 does not perform a boosting operation but outputs the input voltage as is, a potential of the point B becomes the VCC potential, as with the potential of the point A on the input side of the booster 101.

Then at a first timing when the STBYB signal becomes "H", the booster power supply circuit 100 switches to the operation mode. In the operation mode, at the first timing when the STBYB signal rises, the first switching device SW1 switches from OFF to ON state, whereas the second switching device SW2 switches from ON to OFF state. The third switching device SW3 remains to be OFF state. Accordingly in the operation mode as shown in FIG. 1, the circuit is configured with the first switching device SW1 being ON state, the second switching device SW2 and the third switching device SW3 being OFF state. At this time the booster 101 boosts the input voltage to a desired output voltage Vout. Then the output voltage Vout boosted by the booster 101 is output to an internal circuit via the first switching device SW1. Therefore as shown in FIG. 3, the potential of the point B becomes the boosted voltage of the boosted output voltage Vout. At this time, the second smoothing capacitor C2 functions as a capacity to stable the voltage of the output potential Vout.

After that, at a second timing when STBYB signal becomes "L", the booster power supply circuit 100 switches from the operation mode to the standby mode. In the standby mode, at the second timing when the STBYB signal falls, the first switching device SW1 switches from ON to OFF state. Further at the second timing, the DISC signal rises. At the timing that the DISC signal rises, the third switching device SW3 switches from OFF to ON state. At this time, the second switching device SW2 remains to be OFF state. Thus charge accumulated in the second smoothing capacitor can be discharged to ground. Specifically, when the DISC signal is "H", the charge accumulated in the second smoothing capacitor is discharged to ground. Accordingly, if the second smoothing capacitor C2 is discharging in the standby mode, in the booster power supply circuit 100, the first switching device SW1 and second switching device SW2 are OFF state while the third switching device SW3 is ON state as shown in FIG. 2.

When the charge in the second smoothing capacitor C2 moved and a potential of the second smoothing capacitor C2 becomes lower than the VCC potential of the input voltage, the second switching device SW2 is switched from OFF to ON state and the third switching device SW3 is switched from ON to OFF state at a third timing when the DISC signal falls. Thus the second smoothing capacitor C2 is recharged to the VCC potential.

"H" periods of the DISC signal can be determined in consideration over the discharging time until the potential of the second smoothing capacitor C2 becomes lower than the VCC potential, from the capacity of the second smoothing capacitor C2 and resistance values of the third switching device SW3 and current limiting resistance device R1. That is, the DISC signal is designed to be active until the potential of the second smoothing capacitor C2 becomes lower than VCC charge by discharging the charge of the second smoothing capacitor C2. Note that it is preferable to discharge the potential of the second smoothing capacitor C2 to be equal to the VCC potential. Thus the electric power needed to recharge to the second smoothing capacitor C2 can be suppressed.

As described in the foregoing, by controlling the second switching device SW2 and third switching device SW3 by the DISC signal, all the charge accumulated in the second smoothing capacitor C2 is not discharged when switching to the standby mode. Thus when switching from the standby mode to the operation mode, the charge supplied to the second smoothing capacitor C2 can be reduced and the power consumption can be suppressed.

Further, the second smoothing capacitor C2 is recharged and its potential is to be the VCC potential. Accordingly as in a conventional technique, the potential of the point A does not increase due to the charge remained in the second smoothing capacitor C2. Thus an undefined voltage will not be applied to the external power supply VCC and the input part of the booster 101. Therefore, the reliability of the booster power supply circuit 100 can be improved.

After that, at the timing the STBYB signal becomes "H", the booster power supply circuit 100 again switches from the standby mode to the operation mode. In the operation mode, at the timing the STBYB signal rises, the first switching device SW1 switches from OFF to ON state whereas the second switching device SW2 switches from ON to OFF state. Furthermore, the third switching device SW3 remains to be OFF state. At this time as described in the foregoing, the potential of the second smoothing capacitor C2 is recharged to be the VCC potential in the standby mode. Therefore, it is possible to reduce the time till the completion of boosting operation at a transition from the standby mode to the operation mode.

Second Embodiment

Figure 4:
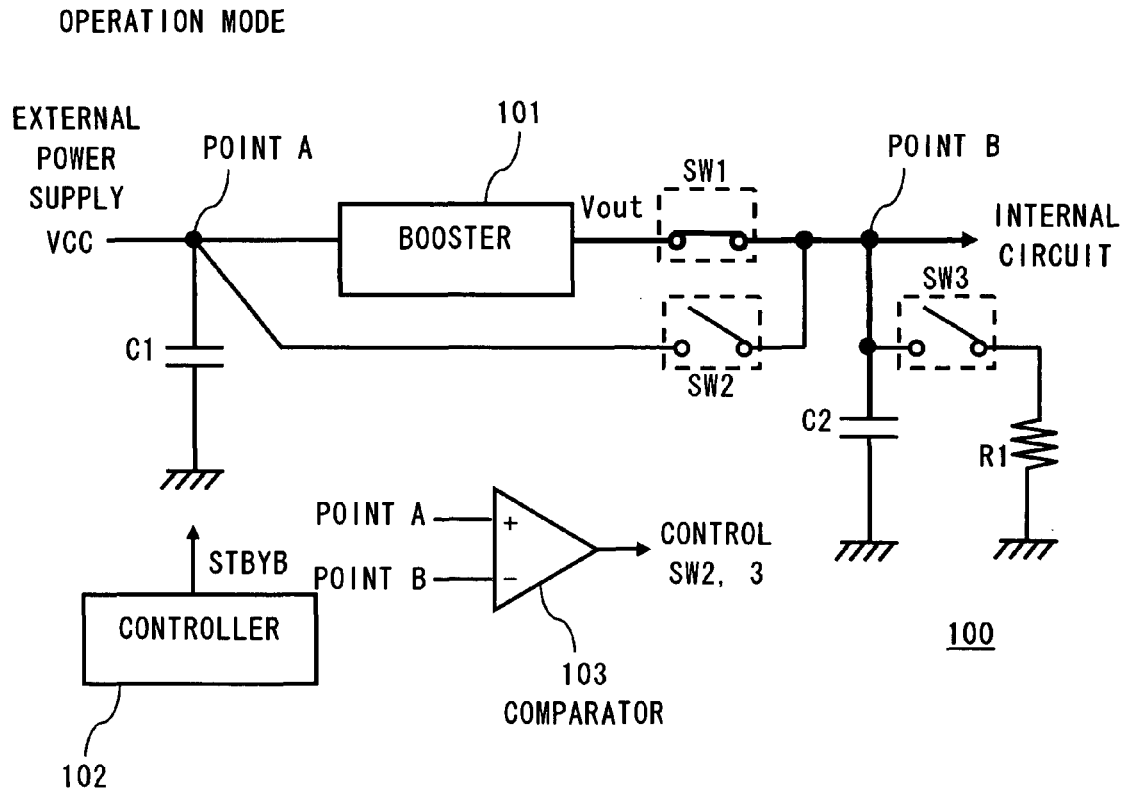
FIG. 4 is a view showing a state of a switching device in an operation mode of a booster power supply circuit according to a second embodiment of the present invention.
Figure 5:
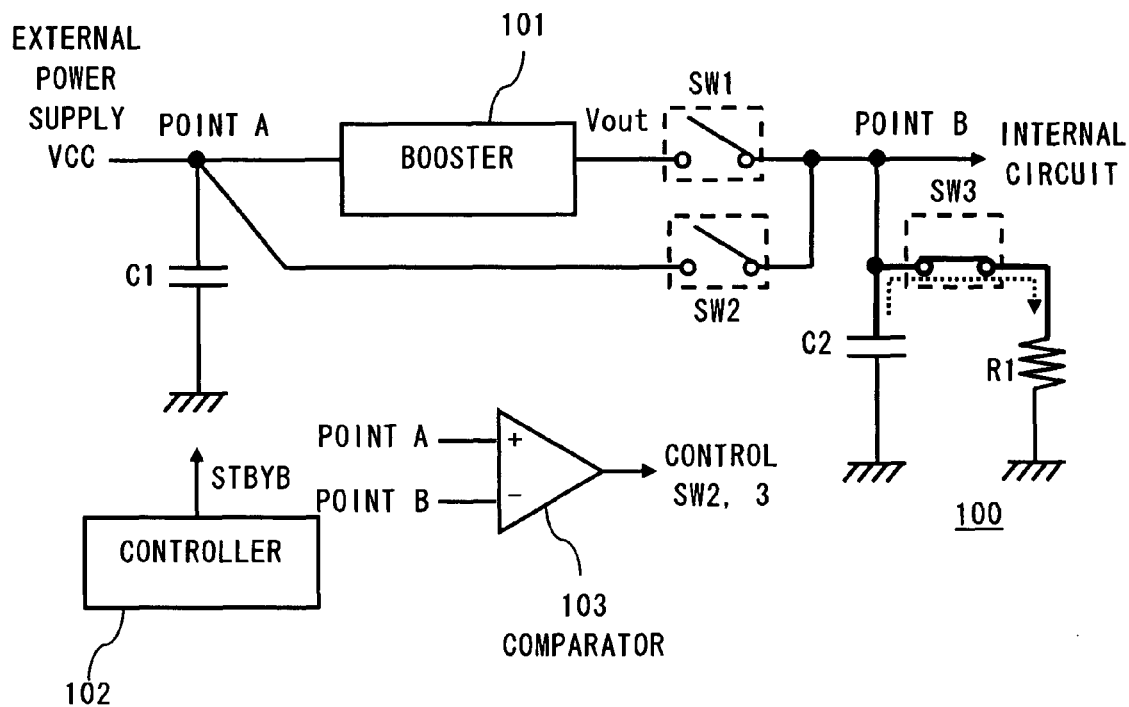
FIG. 5 is a view showing a state of the switching device immediately after changing from the operation mode to a standby mode (where a potential of the point A is lower than that of the point B) of the booster power supply circuit according to the second embodiment of the present invention.
Figure 6:
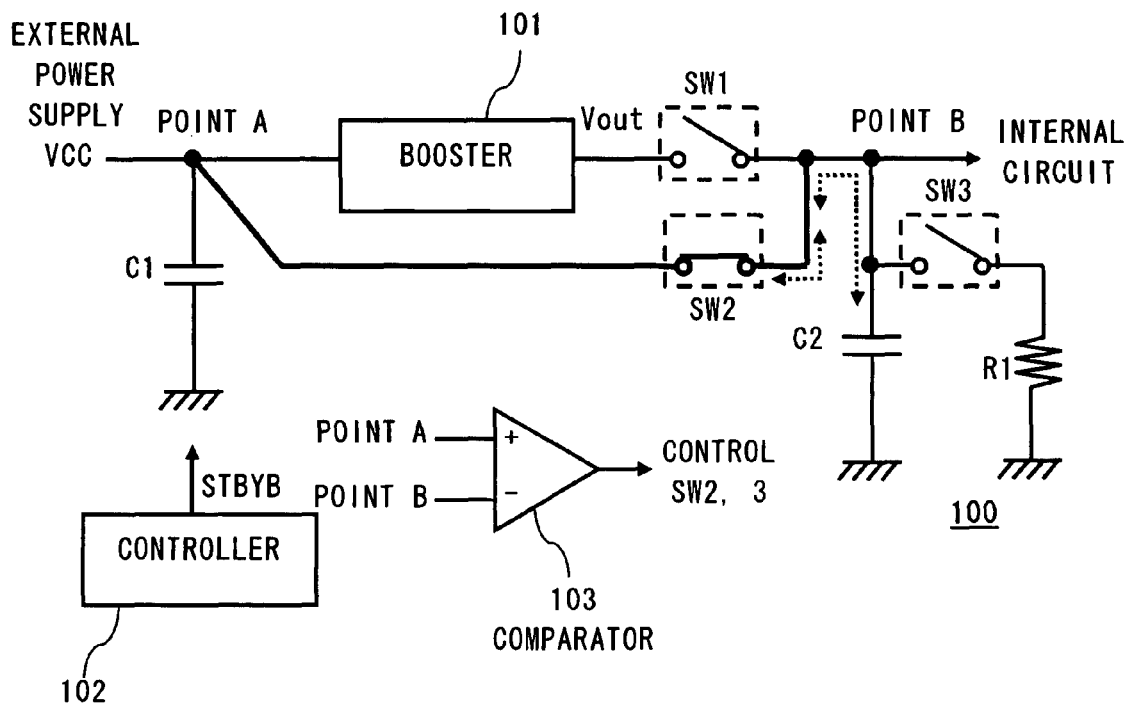
FIG. 6 is a view showing a state of the switching device after predetermined time from changing from the operation mode to the standby mode (where the potential of the point A is higher than that of the point B) of the booster power supply circuit according to the second embodiment of the present invention.

A booster power supply circuit 100 according to a second embodiment of the present invention is described hereinafter in detail with reference to FIGS. 4 to 6. FIGS. 4 to 6 are views showing the configuration of the booster power supply circuit 100. FIG. 4 is a view showing a state of a switching device in an operation mode of the booster power supply circuit 100. Further, FIG. 5 is a view showing a state of the switching device immediately after changing from the operation mode to a standby mode (where a potential of the point A is lower than that of the point B) of the booster power supply circuit according to a second embodiment of the present invention. FIG. 6 is a view showing a state of the switching device after predetermined time from changing from the operation mode to the standby mode (where the potential of the point A is higher than that of the point B) of the booster power supply circuit according to the second embodiment of the present invention. A difference of this embodiment from the first embodiment is that in this embodiment, the DISC signal is not supplied from the controller but instead, a comparator for comparing the potentials of the points A and B is provided. In FIGS. 4 to 6, components identical to those in FIG. 1 are denoted by reference numerals identical to those therein with detailed description omitted.

As shown in FIGS. 4 to 6, the booster power supply circuit 100 of this embodiment includes a booster 101, controller 102 and comparator 103 or the like. The configuration of the booster power supply circuit 100 of this embodiment is almost the same as the one in the first embodiment. Specifically, a first smoothing capacitor C1 is provided in an input side of the booster 101, and one electrode of the first smoothing capacitor C1 is connected to a ground potential. Further, a second smoothing capacitor C2 is provided on an output side of the booster 101 via a first switching device SW1. Another electrode of the second smoothing capacitor C2 is connected to a ground potential. Additionally, the first smoothing capacitor C1 and second smoothing capacitor C2 are connected via a second switching device SW2. Another electrode of the second capacitor C2 is connected to the ground potential via a third switching device SW3 and a current limiting resistance device R1. A contact between an electrode of the first smoothing capacitor C1 and the input side of the booster 101 is referred to as a point A. A contact between an electrode of the second smoothing capacitor C2 and the input side of the booster 101 is referred to as a point B.

The controller 102 used in this embodiment outputs the STBYB signal. As described in the foregoing, the STBYB signal is a signal for switching between the abovementioned operation mode and standby mode. The booster power supply circuit 100 becomes the operation mode when the STBYB signal is "H" and becomes the standby mode when "L".

A comparator 103 always monitors the potentials of the points A and B. Further, the comparator 103 either discharges the charge accumulated in the second smoothing capacitor C2 in the standby mode or controls the second switching device SW2 and third switching device SW3 so as to connect the second smoothing capacitor C2 with the first smoothing capacitor C1. Specifically, in the first embodiment, the second switching device SW2 and switching device SW3 are controlled by the DISC signal input from the controller 102. However in the second embodiment, each of the switching devices is controlled by the comparator 103 monitoring the potentials of the points A and B. In this embodiment, the point A is connected to + input terminal of the comparator 103 and the point B is connected to − input terminal. Accordingly the comparator 103 outputs a "H" level signal if the potential of the point A is higher than that of the point B, whereas "L" level signal is output if the potential of the point B is higher than that of the point B.

Figure 7:
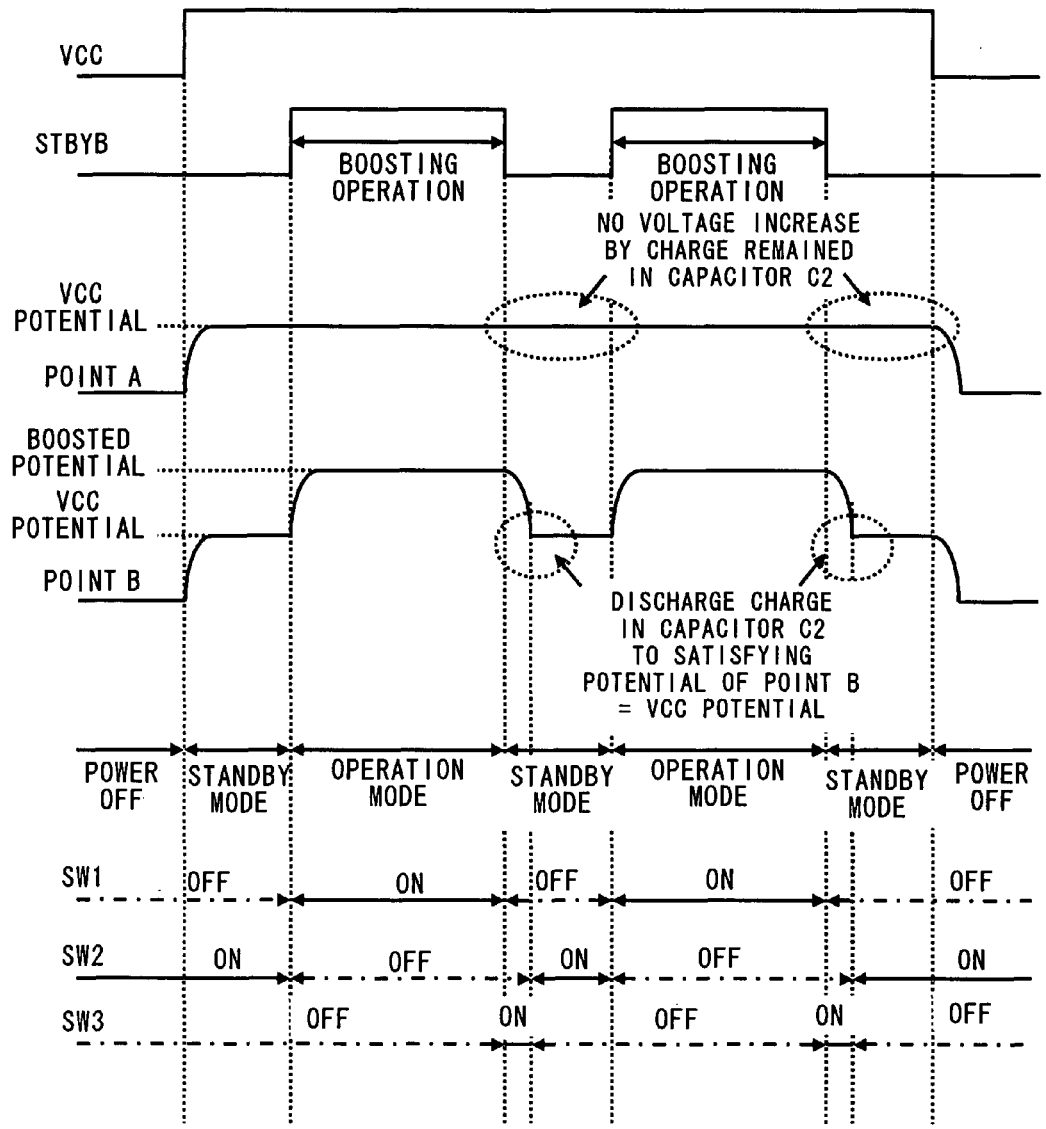
FIG. 7 is a view explaining an operation of the booster power supply circuit according to the second embodiment of the present invention.

A control method of the booster power supply circuit 100 according to the second embodiment is described hereinafter in detail with reference to FIG. 7. FIG. 7 is a view showing an operation output waveform of the booster power supply circuit 100 according to this embodiment. As shown in FIG. 7, while the power is OFF to be ON, when the input voltage is supplied from the external power supply VCC, the potential of the point A becomes VCC potential of the input voltage. At this time, as the STBYB signal is "L", the booster power supply circuit 100 is in the standby mode. In the standby mode immediately after the power becomes ON state, the first switching device SW1 is OFF state, second switching device SW2 is ON state and third switching device SW3 is OFF state. Moreover in the standby mode, since the booster 101 does not perform a boosting operation but outputs the input voltage as is, the potential of the point B becomes the VCC potential, as with the potential of the point A on the input side of the booster 101.

Then at a first timing when the STBYB signal becomes "H", the booster power supply circuit 100 switches to the operation mode. In the operation mode, at the first timing when the STBYB signal rises, the first switching device SW1 switches from OFF to ON state, whereas the second switching device SW2 switches from ON to OFF state. The third switching device SW3 remains to be OFF state. Accordingly in the operation mode as shown in FIG. 4, the circuit is configured with the first switching device SW1 being ON state, the second switching device SW2 and the third switching device SW3 being OFF state. At this time the booster 101 boosts the input voltage to a desired output voltage Vout. Then the output voltage Vout boosted by the booster 101 is output to an internal circuit via the first switching device SW1. Therefore as shown in FIG. 7, the potential of the point B becomes the boosted voltage of the boosted output voltage Vout. At this time, the second smoothing capacitor C2 functions as a capacity to stable the voltage of the output potential Vout.

After that, at a second timing when STBYB signal becomes "L", the booster power supply circuit 100 switches from the operation mode to the standby mode. In the standby mode, at the second timing when the STBYB signal falls, the first switching device SW1 switches from ON to OFF state. Then the comparator 103 operates only in the standby mode (where STBYB signal is "L") and the potentials of the points A and B are compared. As a result, if the potential of the point A is lower than that of the point B, the comparator 103 outputs "L" level signal. When the output from the comparator 103 is "L", the second switching device SW2 is turned OFF and the third switching device SW3 is turned ON as shown in FIG. 5. Thus the charge accumulated in the second smoothing capacitor can be discharged to ground.

Conversely if the potential of the point A is higher than that of the point B, the comparator 103 outputs a "H" level signal. When the output from the comparator 103 is "H", the second switching device SW2 is turned ON and the third switching device SW3 is turned OFF as shown in FIG. 6. Thus the second smoothing capacitor C2 is connected to the external power supply VCC and the VCC potential is charged.

As described in the foregoing, by the comparator 103 controlling the second switching device SW2 and third switching device SW3 by the DISC signal, all the charge accumulated in the second smoothing capacitor C2 is not discharged when switching to the standby mode. Thus when switching from the standby mode to the operation mode, the charge supplied to the second smoothing capacitor C2 can be reduced and the power consumption can be suppressed. Accordingly, the potential of the point A does not increase due to the charge remained in the second smoothing capacitor C2 because the potential of the second smoothing capacitor C2 can always be the VCC potential. Thus an undefined voltage will not be applied to the external power supply VCC and the input part of the booster 101. Therefore, the reliability of the booster power supply circuit 100 can be improved. Further in the standby mode, the potential of the second smoothing capacitor C2 is charged to be the VCC potential. Therefore, it is possible to reduce the time till the completion of boosting operation at a transition from the standby mode to the operation mode.

In comparison with the first embodiment, this embodiment enables to control the second switching device SW2 and third switching device SW3 by the comparator 103 directly monitoring the potentials of the points A and B, thus the charge in the second smoothing capacitor C2 will not be over-discharged. Further, as it is not necessary to design with a consideration over the discharging time for the second smoothing capacitor C2 to be the VCC potential, the booster power supply circuit 100 can easily be designed.

Third Embodiment

Figure 8:
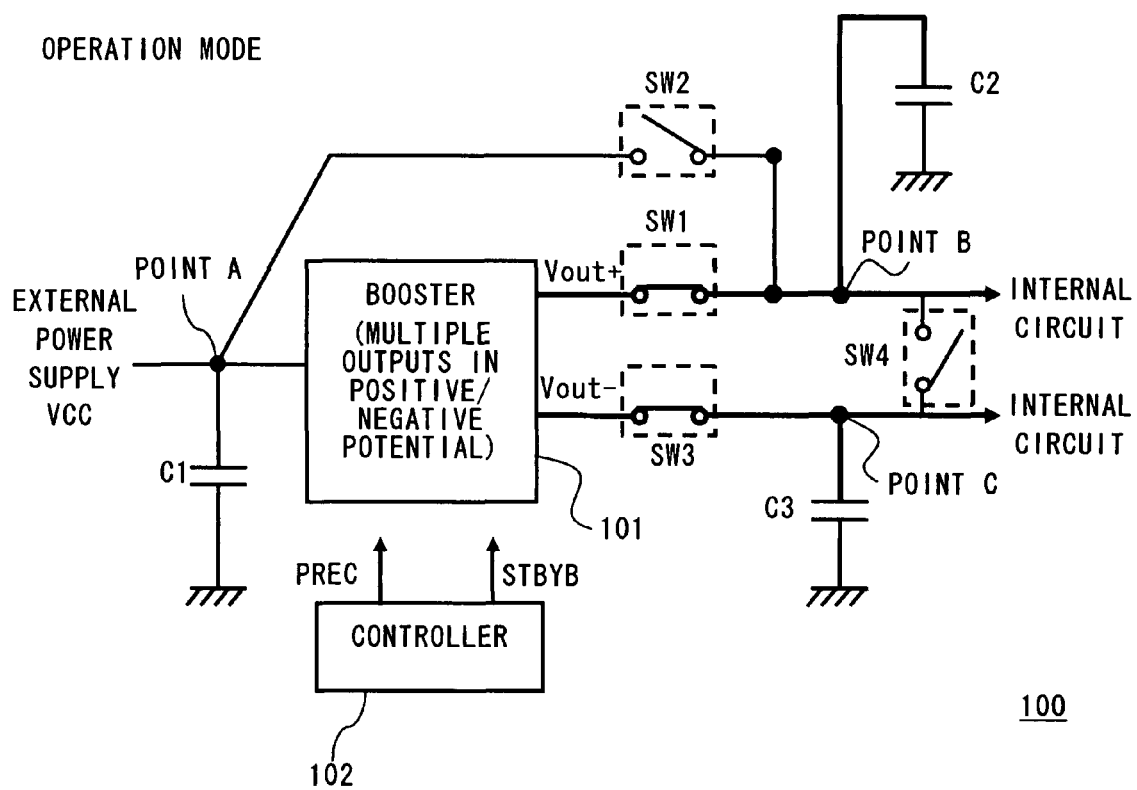
FIG. 8 is a view showing a state of a switching device in an operation mode of a booster power supply circuit according to a third embodiment of the present invention.
Figure 9:
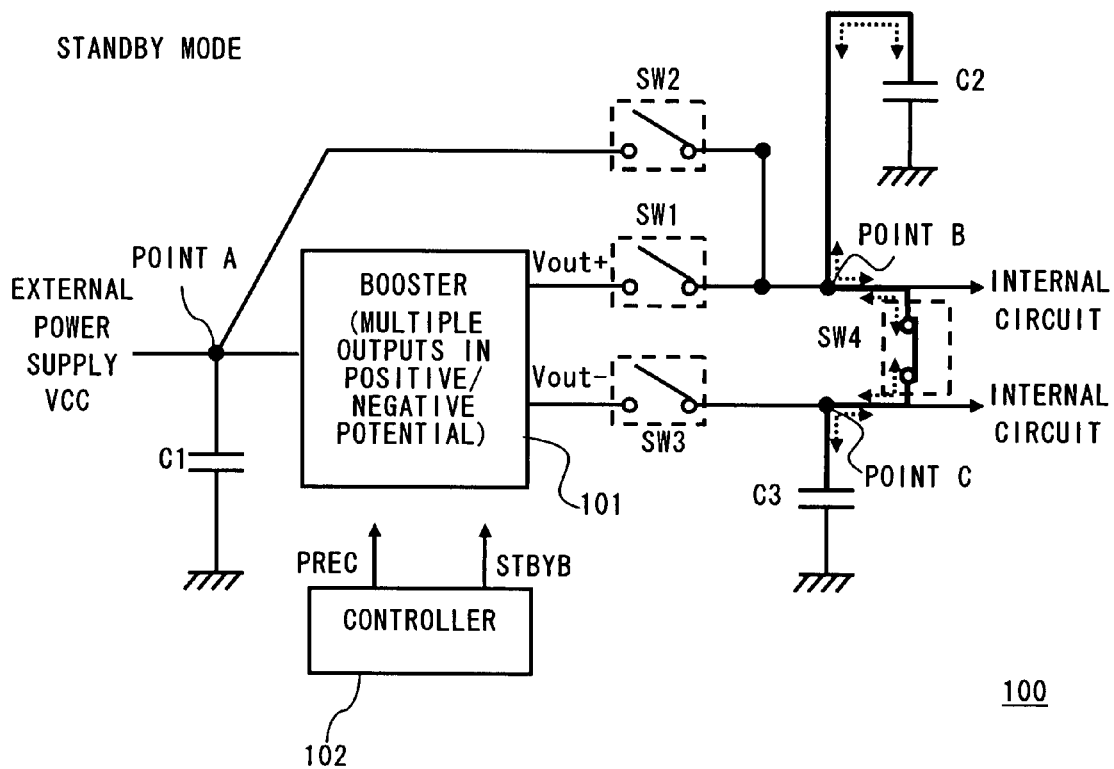
FIG. 9 is a view showing a state of the switching device immediately after changing from the operation mode to the standby mode of the booster power supply circuit according to the third embodiment of the present invention.

A booster power supply circuit 100 of a third embodiment of the present invention is described hereinafter in detail with reference to FIGS. 8 and 9. FIGS. 8 and 9 are views showing the configuration of the booster power supply circuit 100 according to this embodiment. FIG. 8 is a view showing a state of a switching device in the operation mode of the booster power supply circuit 100 according to this embodiment. FIG. 9 is a view showing the state of the switching device immediately after changing from the operation mode to the standby mode of the booster power supply circuit 100 according to the third embodiment of the present invention. The booster power supply circuit 100 of this embodiment is to cancel out the charge in the second smoothing capacitor to obtain an equivalent effect as discharging. This embodiment is especially effective when using a booster for outputting multiple voltages for example generating both a positive and negative voltage as the booster 101. In FIGS. 8 to 9, components identical to those in FIG. 1 are denoted by reference numerals identical to those therein with detailed description omitted.

As shown in FIGS. 8 and 9, the booster power supply circuit of this embodiment includes a booster 101 and a controller 102 or the like. The booster 101 used in this embodiment boosts the input voltage input from the external power supply VCC to a desired positive output voltage (positive output Vout+), and negative output voltage (negative output Vout−). A first smoothing capacitor C1 is provided in an input side of the booster 101. A contact between an electrode of the first smoothing capacitor C1 and the input side of the booster 101 is referred to as a point A. Further, another electrode of the first smoothing capacitor C1 is connected to a ground potential.

A second smoothing capacitor C2 is provided on an output side of the positive output Vout+ of the booster 101 via a first switching device SW1. The second smoothing capacitor C2 smooths the positive output Vout+. A contact between an electrode of the second smoothing capacitor C2 and the input side of the booster 101 is referred to as a point B. Further, another electrode of the second smoothing capacitor C2 is connected to a ground potential. Additionally, the first smoothing capacitor C1 and second smoothing capacitor C2 are connected via a second switching device SW2.

A third smoothing capacitor C3 is provided on the output side of the negative output Vout− via a third switching device SW3. The third smoothing capacitor C3 smooths the negative output Vout−. A contact between an electrode of the third smoothing capacitor C3 and the output side of the booster 101 is referred to as a point C. Further, another electrode of the third smoothing capacitor C3 is connected to a ground potential. The second smoothing capacitor C2 and third smoothing capacitor C3 are connected via a fourth switching device SW4. Specifically, the positive output Vout+ and negative output Vout− are connected via the switching device SW4.

The controller 102 outputs the STBYB signal (standby mode control signal) and a PREC signal (precharge control signal). The STBYB signal is a signal for switching between the abovementioned operation mode and standby mode. The booster power supply circuit 100 becomes the operation mode when the STBYB signal is "H" and becomes the standby mode when "L". Further, the PREC signal is a signal for controlling the second switching device SW2 so as to charge the second smoothing capacitor C2 to the VCC potential.

Figure 10:
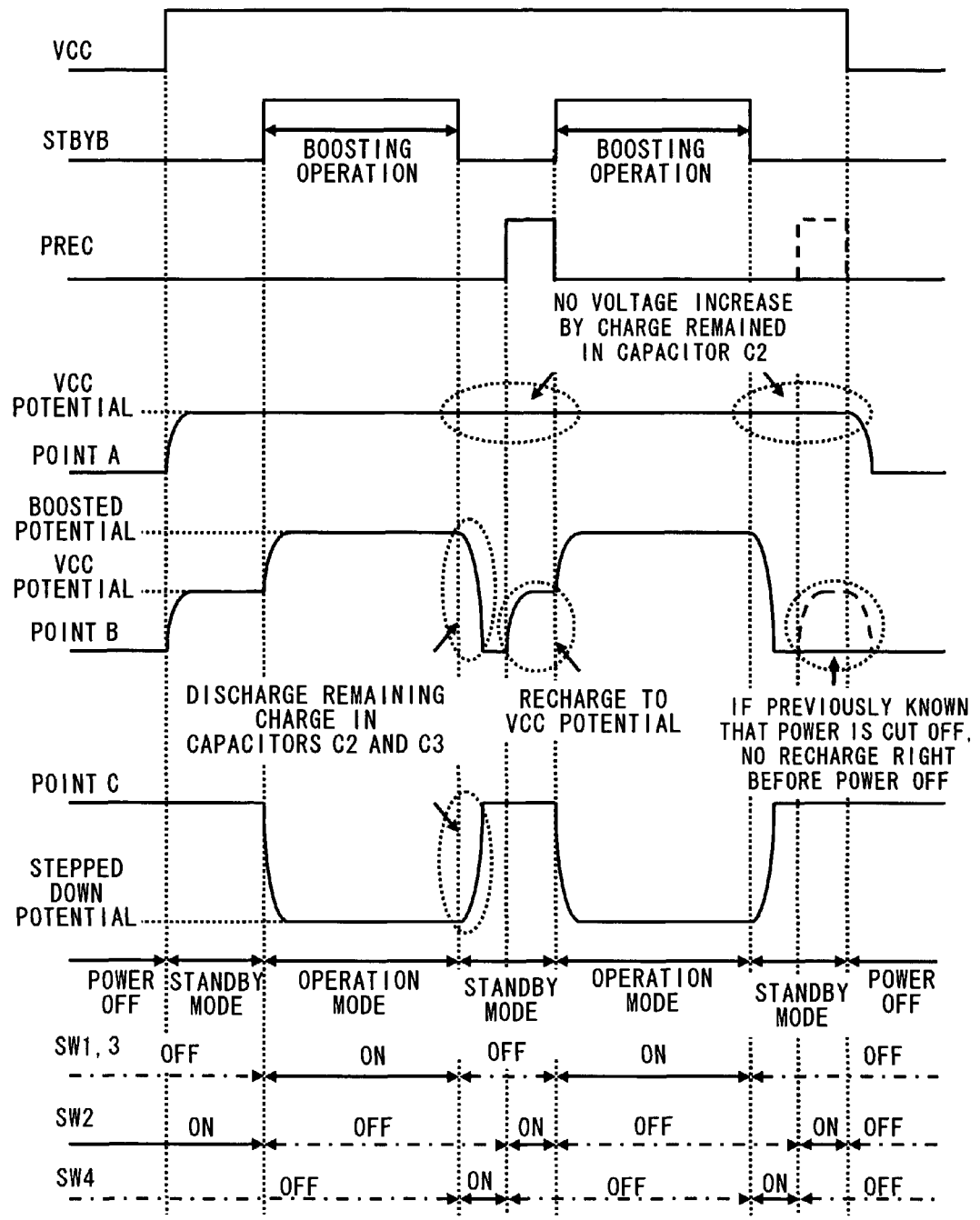
FIG. 10 is a view explaining an operation of the booster power supply circuit according to the third embodiment of the present invention.

A control method of the booster power supply circuit 100 of the third embodiment is described hereinafter in detail with reference to FIG. 10. FIG. 10 is a view showing an operation output waveform of the booster power supply circuit 100 according to this embodiment. As shown in FIG. 10, while the power is OFF to be ON, when the input voltage is supplied from the external power supply VCC, a potential of the point A becomes the VCC potential of the input voltage. At this time, as the STBYB signal is "L", the booster power supply circuit 100 is in standby mode. In the standby mode immediately after the power becomes ON state, the first switching device SW1 is OFF state, the second switching device SW2 is ON state, the third switching device SW3 is OFF state and the fourth switching device SW4 is OFF state. Moreover in the booster power supply circuit 100 of this embodiment, in the standby mode, the booster 101 does not perform a boosting operation but outputs the positive output Vout+ as is. Thus a potential of the point B becomes the VCC potential, as with the potential of the point A on the input side of the booster 101. On the other hand, the negative output Vout− of the booster 101 outputs a ground potential. Thus a potential of the point C becomes the ground potential.

Then at a first timing when the STBYB signal becomes "H", the booster power supply circuit 100 switches to the operation mode. In the operation mode, at the first timing when the STBYB signal rises, the first switching device SW1 switches from OFF to ON state. On the other hand, the second switching device SW2 switches from ON to OFF state. The fourth switching device SW4 remains to be OFF state. Accordingly in the operation mode as shown in FIG. 8, the circuit is configured with the first switching device SW1 and third switching device SW3 being ON state, the second switching device SW2 and fourth switching device SW4 being OFF.

At this time, the booster 101 boosts the input voltage from the external power supply VCC to the desired positive output Voltage. Then the positive output voltage output from the positive output Vout+ is output to an internal circuit via the first switching device SW1. Thus as shown in FIG. 10, the potential of the point B becomes the boosted voltage of the positive output Vout+. At this time, the second smoothing capacitor C2 functions as a capacity to stable the voltage of the positive output Vout+.

Further, the booster 101 steps down the input voltage input from the external power supply VCC to the desired negative output Voltage. Then the negative output voltage output from the negative output Vout− is output to an internal circuit via the third switching device SW3. Thus as shown in FIG. 10, the potential of the point C becomes the stepped down voltage of the positive output Vout−. At this time, the third smoothing capacitor C3 functions as a capacity to stable the voltage of the negative output Vout−.

After that, at a second timing when STBYB signal becomes "L", the booster power supply circuit 100 switches from the operation mode to the standby mode. In the standby mode, at the second timing when the STBYB signal falls, the first switching device SW1 and the third switching device SW3 switches from ON to OFF state. Further, the second switching device SW2 remains to be OFF state while the fourth switching device SW4 switches from OFF to ON state. Thus in the standby mode as shown in FIG. 9, the first switching device SW1, second switching device SW2 and third switching device SW3 are OFF state and the fourth switching device SW4 is ON state. This generates a short-out between the second smoothing capacitor C2 accumulated with positive voltage and the third smoothing capacitor C3 accumulated with negative voltage by the fourth switching device SW4. By the short-out, the charge accumulated in the second smoothing capacitor C2 and the third smoothing capacitor C3 are cancelled out, thereby obtaining an equivalent effect as discharging.

Potentials of the second smoothing capacitor C2 and third smoothing capacitor C3 after their charges been cancelled out are uniquely determined by the positive output Vout+, negative output Vout−, and capacities of the second smoothing capacitor C2 and third smoothing capacitor C3. For example, assuming that the potential of the positive output Vout+ is V1[V], the potential of the negative output Vout− is −V2[V], the capacity of the second smoothing capacitor C2 is C1[F] and the capacity of the third smoothing capacitor C3 is C2[F], the potentials Vo[V] of the points B and C after generating a short-out between the positive output Vout+ and negative output Vout− by turning the fourth switching device SW4 to ON can be represented by the following formula.

$$Vo = (C1 \cdot V1 - C2 \cdot V2)/(C1+C2)[V]$$

By the abovementioned formula, if the potentials of the positive output Vout+ and negative output Vout− is symmetric in positive and negative and also C1=C2, the potential Vo is 0[V].

After that, when the PREC signal becomes "H", the second switching device SW2 switches from OFF to ON state and the fourth switching device SW4 switches from ON to OFF state. At this time, the first switching device SW1 and third switching device SW3 remain to be OFF state. Thus the second smoothing capacitor C2 is connected to the first smoothing capacitor C1 via the second switching device SW2. This makes the second smoothing capacitor C2 to be recharged to the VCC potential. Note that there is no advantage in charging the third smoothing capacitor C3 to the VCC potential, which is a positive potential, because the third smoothing capacitor C3 is connected to the negative output Vout− and supplied with a negative voltage in the operation mode. Therefore, the third smoothing capacitor C3 is not connected to the VCC potential.

As described in the foregoing, a short-out is generated between the second smoothing capacitor C2 and third smoothing capacitor C3 by the fourth switching device SW4. Accordingly, the potential of the point A does not increase due to the charge remained in the second smoothing capacitor C2 and the third smoothing capacitor C3. Further, an undefined voltage will not be applied to the external power supply VCC and the input part of the booster 101. Therefore, the reliability of the booster power supply circuit 100 can be improved.

After that, at the timing the STBYB signal becomes "H", the booster power supply circuit 100 again switches from the standby mode to the operation mode. In the operation mode, at the first timing when the STBYB signal rises, the first switching device SW1 and third switching device SW3 switch from OFF to ON state, whereas the second switching device SW2 switches from ON to OFF state. Further, the fourth switching device SW4 remains to be OFF state. At this time as described in the foregoing, the potential of the second smoothing capacitor C2 is recharged to be the VCC potential in the standby mode. Therefore, it is possible to reduce the time till the completion of boosting operation at a transition from the standby mode to the operation mode.

Moreover in FIG. 10, immediately before the power is OFF, the second smoothing capacitor C2 is not needed to be recharged to the VCC potential as the potential of the point B is indicated by the broken line. Therefore, if it is previously know that the power is to be OFF, the second smoothing capacitor C2 may be controlled not to be recharged.

As described in the foregoing, by providing one switching device for generating a short-out between the positive output Vout+ and negative output Vout− to control, it is possible to achieve an equivalent effect as discharging the charge in the second smoothing capacitor C2 and third smoothing capacitor C3 with a simple circuit configuration. Accordingly the circuit size can be prevented from increasing as only one switching device and a control circuit are provided in an existing booster power supply circuit having a booster outputting multiple voltages.

Fourth Embodiment

Figure 11:
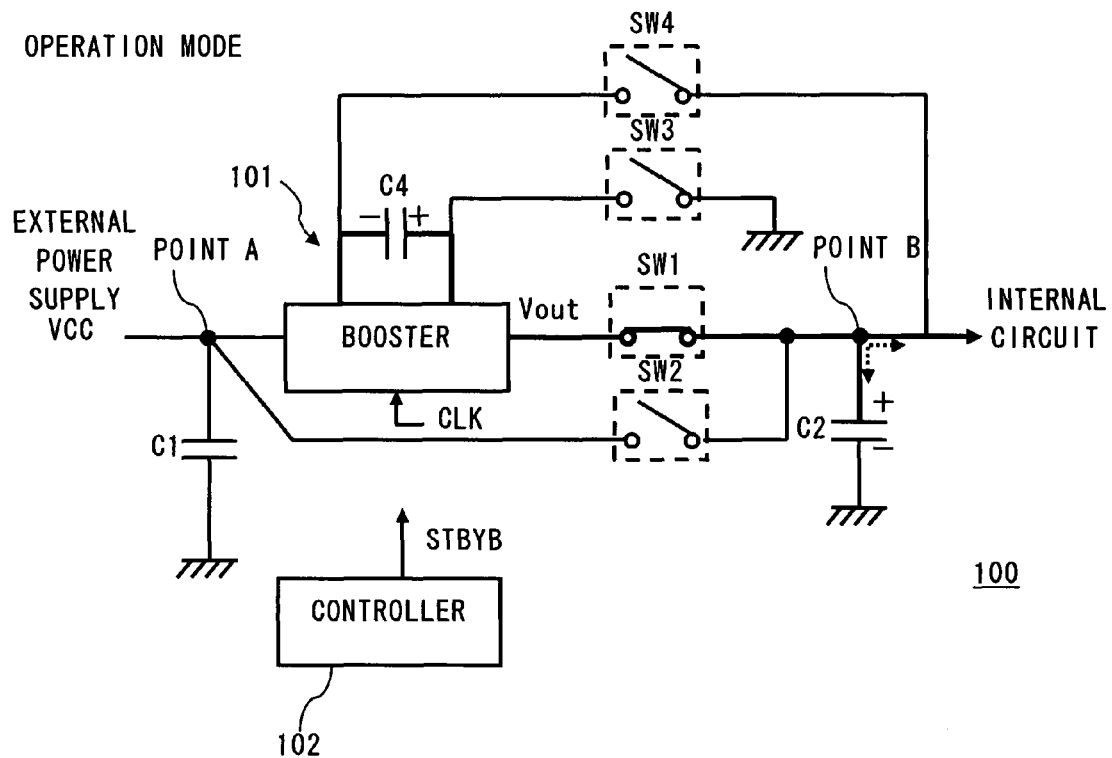
FIG. 11 is a view showing a state of a switching device in an operation mode of a booster power supply circuit according to a fourth embodiment of the present invention.
Figure 12:
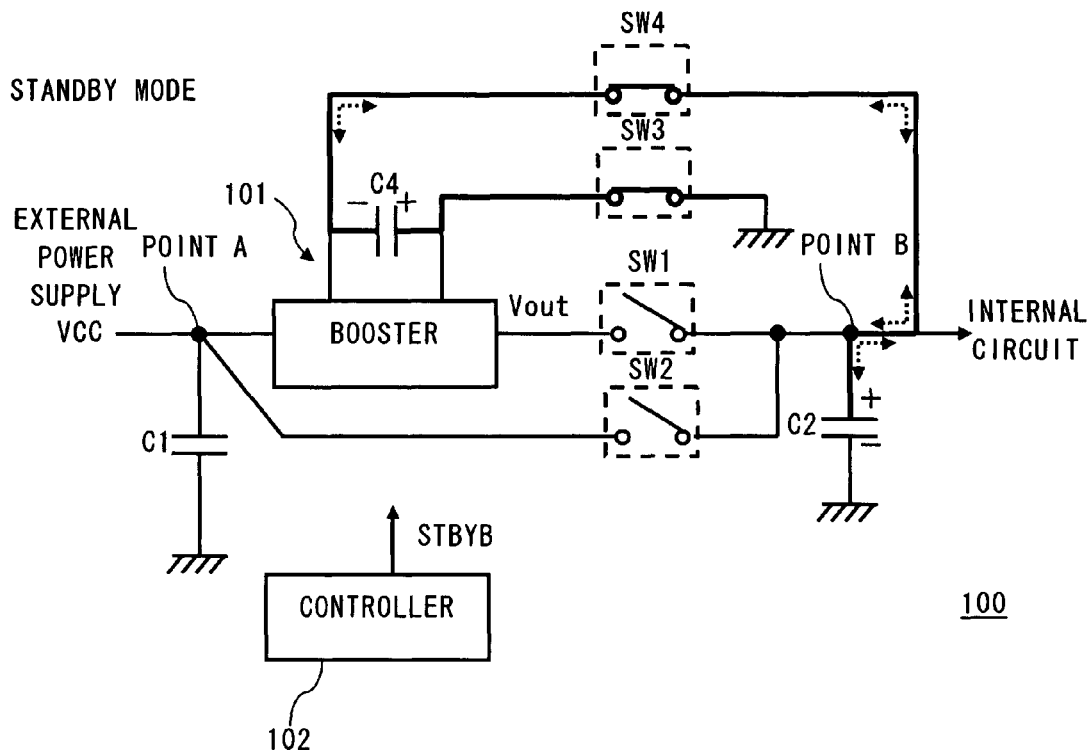
FIG. 12 is a view showing a state of a switching device immediately after changing from the operation mode to a standby mode of the booster power supply circuit according to the fourth embodiment of the present invention.

A booster power supply circuit 100 according to a first embodiment of the present invention is described hereinafter in detail with reference to FIGS. 11 and 12. FIGS. 11 and 12 are views showing the configuration of the booster power supply 100 of this embodiment. FIG. 11 is a view showing a state of a switching device in the operation mode of the booster power supply circuit 100 of this embodiment. Further, FIG. 12 is a view showing a state of the switching device immediately after changing from the operation mode to the standby mode of the booster power supply circuit 100 according to this embodiment. The booster power supply circuit 100 of this embodiment discharges the charge in the second smoothing capacitor C2 using a boosting capacitor C4 that is provided in the booster 101.

As shown in FIGS. 11 and 12, the booster power supply circuit 100 includes a booster 101 and controller 102 or the like. Further, the booster 101 includes the boosting capacitor C4. Note that the boosting capacitor 101 may include a plurality of boosting capacitors. In the operation mode, the booster 101 performs a boosting operation according a CLK signal input externally and outputs a desired output voltage Vout from the input voltage input from the external power supply VCC. On an input side of the booster 101, a first smoothing capacitor C1 is provided for smoothing the input voltage. A contact between an electrode of the first smoothing capacitor C1 and the input side of the booster 101 is referred to as a point A. Further, another electrode of the first smoothing capacitor C1 is connected to a ground potential.

A second smoothing capacitor C2 is provided to an output side of the booster 101 via a first switching device SW1. The second smoothing capacitor C2 smooths an output voltage Vout. A contact between an electrode of the second smoothing capacitor C2 and the output side of the booster 101 is referred to as a point B. Further, another electrode of the second smoothing capacitor C2 is connected to a ground potential. Additionally, the first smoothing capacitor C1 and second smoothing capacitor C2 are connected via a second switching device SW2.

One electrode of the boosting capacitor C4 inside the booster 101 is connected to a ground potential via a third switching device SW3. On the other hand, another electrode of the boosting capacitor C4 is connected to an output side of the booster 101 via the fourth switching device SW4, connected at a lower point in the current than the point B.

The controller 102 outputs a STBYB signal (standby mode control signal). The STBYB signal is a signal for switching between the operation mode and standby mode. The booster power supply circuit 100 becomes the operation mode when the STBYB signal is "H" and becomes the standby mode when "L".

Figure 13:
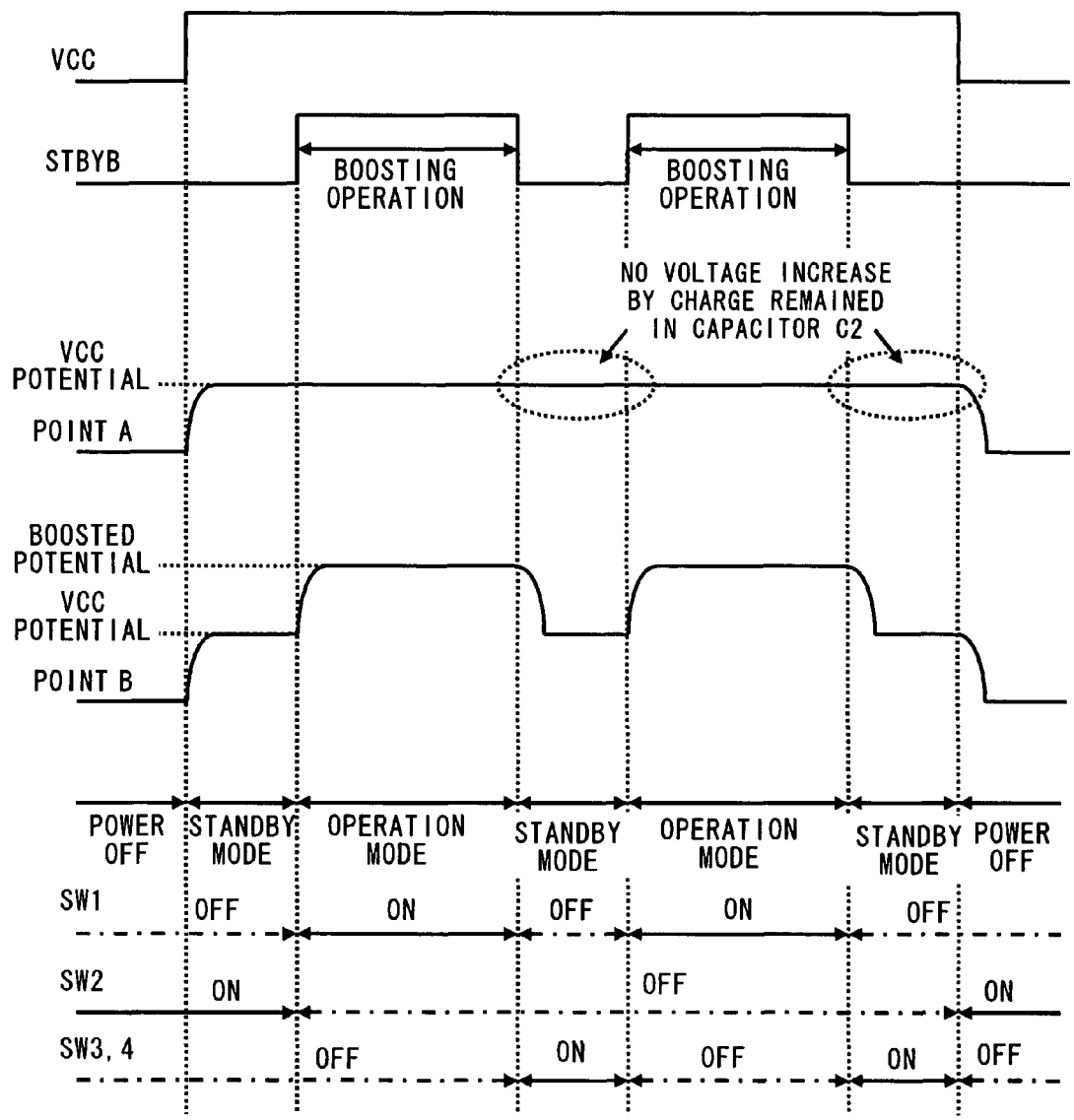
FIG. 13 is a view explaining an operation of the booster power supply circuit according to the fourth embodiment of the present invention.
Figure 14:
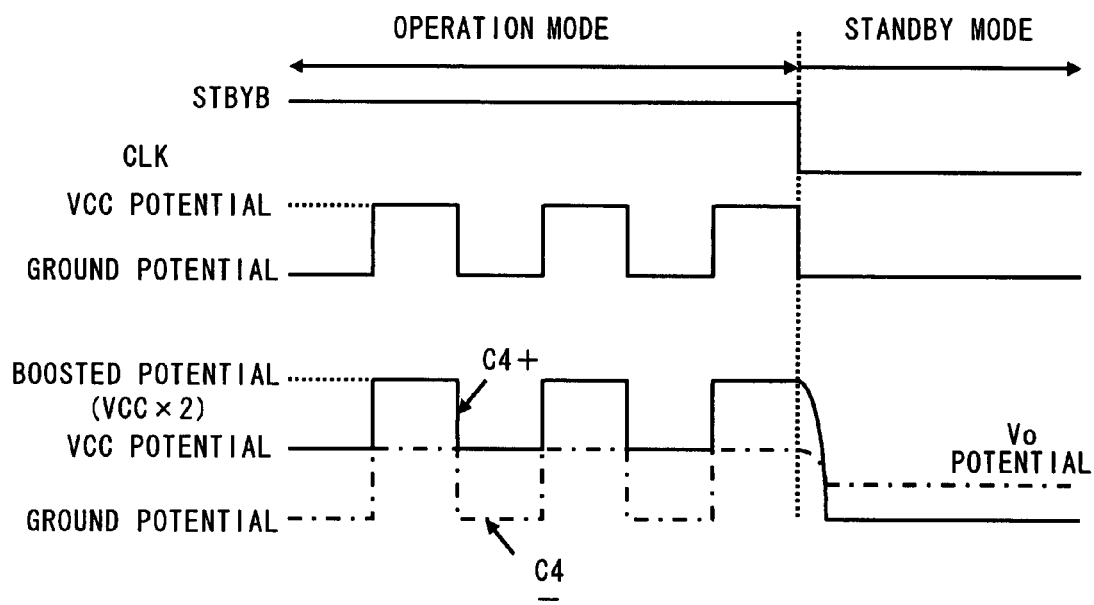
FIG. 14 is a view showing a potential of a booster capacitor according to the fourth embodiment of the present invention.
Figure 15:
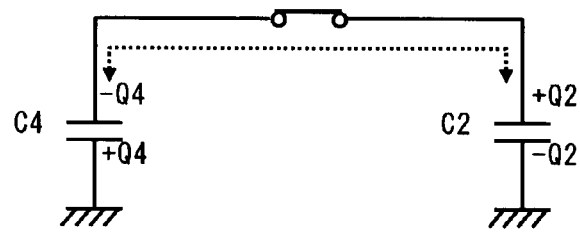
FIG. 15 is an equivalent circuit diagram of the booster power supply circuit in the standby mode according to the fourth embodiment of the present invention.

A control method of the booster power supply circuit 100 according to the fourth embodiment is described hereinafter in detail with reference to FIGS. 13 to 15. FIG. 13 is a view showing an operation output waveform of the booster power supply circuit 100 according to this embodiment. Further, FIG. 14 is a view showing a potential waveform of a boosting capacitor C4 shown in FIGS. 11 and 12. In FIG. 14, a potential waveform of + electrode of the boosting capacitor C4 is indicated by the solid line while a potential waveform of − electrode is indicated by the chain line. FIG. 15 is an equivalent circuit diagram showing a part of the booster power supply circuit 100 in the standby mode. Here, a case in which the booster 101 boosts double is described hereinafter.

As shown in FIG. 13, while the power is OFF to be ON state, when the input voltage is supplied from the external power supply VCC, a potential of the point A becomes VCC potential of the input voltage. At this time, as the STBYB signal is "L", the booster power supply circuit 100 is in the standby mode. In the standby mode immediately after the power becomes ON state, the first switching device SW1 is OFF state, second switching device SW2 is ON state, third switching device SW3 and fourth switching device SW4 are OFF state. Moreover in the standby mode, since the booster 101 does not perform a boosting operation but outputs the input voltage as is, the potential of the point B becomes the VCC potential, as with the potential of the point B on the input side of the booster 101.

Then at a first timing when the STBYB signal becomes "H", the booster power supply circuit 100 switches to the operation mode. In the operation mode, at the first timing when the STBYB signal rises, the first switching device SW1 switches from OFF to ON state, whereas the second switching device SW2 switches from ON to OFF state. The third switching device SW3 and fourth switching device SW4 remain to be OFF state. Accordingly in the operation mode as shown in FIG. 11, the circuit is configured with the first switching device SW1 being ON state, the second switching device SW2, third switching device SW3 and fourth switching device SW4 being OFF.

At this time the booster 101 boosts the input voltage input from the external power supply VCC to a desired output voltage Vout. As shown in FIG. 14, firstly a VCC potential is supplied to + electrode of the boosting capacitor C4 and a ground potential is supplied to − electrode. When the CLK signal input externally rises, the VCC potential is supplied to the − electrode. At this time, as a potential difference between both electrodes of the boosting capacitor C4 remains as the VCC potential, + electrode of the boosting capacitor C4 becomes a doubled VCC potential. Then a switching device (not shown) provided inside the booster 101 becomes ON state and the output voltage Vout, which is the boosted doubled VCC potential, is output from the booster 101. The output voltage Vout is output to an internal circuit via the first switching device SW1. Further, doubled VCC potential (boosted potential) is supplied to the second smoothing capacitor C2. After that when the CLK signal falls, a ground potential is supplied to the − electrode of the boosting capacitor C4. Therefore, the + electrode of the boosting capacitor C4 becomes the VCC potential. At this time, as the switching device (not shown) provided inside the booster 101 becomes OFF state, a voltage will not be output from the booster 101 but a boosted potential accumulated in the second smoothing capacitor C2 is output to the internal circuit. Accordingly in the operation mode as shown in FIG. 13, the potential of the point B becomes a boosted potential boosted by the booster 101. At this time, the second smoothing capacitor C2 functions as a capacity to stable the voltage of the output voltage Vout.

After that, at a second timing when STBYB signal becomes "L", the booster power supply circuit 100 switches from the operation mode to the standby mode. In the standby mode, at the second timing when the STBYB signal falls, the first switching device SW1 switches from ON to OFF state. Further, the third switching device SW3 and fourth switching device SW4 switch from OFF to ON state. On the other hand, the second switching device SW2 remains to be OFF state. Accordingly in the operation mode as shown in FIG. 12, the circuit is configured standby mode the first switching device SW1 and second switching device SW2 being OFF and the third switching device SW3 and fourth switching device SW4 being ON state.

By the third switching device SW3 being ON state, the + electrode of the boosting capacitor C4 is connected to a ground potential. As the potential difference between the both electrodes of the boosting capacitor C4 remains to be VCC, the − electrode of the boosting capacitor C4 becomes −VCC potential. Then, by the fourth switching device SW4 being ON state, the − electrode of the boosting capacitor C4 having −VCC potential is connected to an electrode of the second smoothing capacitor C2 which is 2VCC potential. Specifically as shown in FIG. 15, a short-out is generated between the second smoothing capacitor C2 and fourth smoothing capacitor C4. This enables to cancel out the charge accumulated in the second smoothing capacitor C2 and boosting capacitor C4 and achieves an equivalent effect as discharging.

The potentials of the second smoothing capacitor C2 and boosting capacitor C4 after their charges being cancelled out are uniquely determined by the boosted voltage of the positive output Vout, a potential of the boosting capacitor C4 and capacities of the second smoothing capacitor C2 and boosting capacitor C4. For example in this embodiment in which the booster 101 boosts double, assuming that the potential of the output voltage Vout is V1[V], potentials of both ends of the boosting capacitor C4 becomes V1/2[V]. Further, assuming that the capacity of the second smoothing capacitor C2 is C1[F] and the capacity of the boosting capacitor C4 is C2[F], amount of charge for each capacitor in the operation mode can be represented by the following formula.

Second smoothing capacitor $C2: Q2 = C1 \cdot V1$

Boosting capacitor $C4: Q4 = C2 \cdot V1/2$

In the standby mode, this is shorted out and cancelled out, charge calculated by the formula below remains in each of the second smoothing capacitor C2 and boosting capacitor C4.

$Q2 - Q4 = (2 \cdot C1 - C2) V1/2$

As shown in FIG. 15, the second smoothing capacitor C2 and boosting capacitor C4 will be parallel capacity and their total capacity is C1+C2. Accordingly with the third switching device SW3 and fourth switching device SW4 being ON state, the potential Vo[V] of the point B after generating a short-out between the second smoothing capacitor C2 and boosting capacitor C4 can be represented by the formula below.

$Vo = (Q2 - V4)/(C1 + C2)$ $= (2C1 - C2) V1/2(C1 + C2) \ [V]$

As described in the foregoing, a short-out is generated between the second smoothing capacitor C2 and boosting capacitor C4. Accordingly, the potential of the point A does not increase due to the charge remained in the second smoothing capacitor C2 when switching to the standby mode. Further, an undefined voltage will not be applied to the external power supply VCC and the input part of the booster 101. Therefore, the reliability of the booster power supply circuit 100 can be improved.

After that, at a timing the STBYB signal becomes "H", the booster power supply circuit 100 again switches from the standby mode to the operation mode. In the operation mode, at the timing when the STBYB signal rises, the first switching device SW1 switches from OFF to ON state. Further, the third switching device SW3 and fourth switching device SW4 switch from ON to OFF state. Further, the second switching device SW2 remains to be OFF state. At this time as described in the foregoing, the potential of the second smoothing capacitor C2 is charged to be almost same as the VCC potential in the standby mode. Therefore, it is possible to reduce the time till the completion of boosting operation at a transition from the standby mode to the operation mode. Note that by generating a short-out between the second smoothing capacitor C2 and boosting capacitor C4, capacity and potential of each capacitor can be determined so that the potential of the second smoothing capacitor C2 is charged to the VCC potential.

As described in the foregoing, by providing two switch devices for generating a short-out between the second smoothing capacitor C2 and boosting capacitor C4 to control, it is possible to achieve an equivalent effect as discharging the charge in the second smoothing capacitor C2 and third smoothing capacitor C3 with a simple circuit configuration. Accordingly the circuit size can be prevented from increasing as only two switch devices are provided in an existing booster power supply circuit. Note that in this embodiment, it can be applied to any booster 101, not limited to the booster 101 being a booster for outputting multiple voltages as described in the third embodiment.

Note that in this embodiment, although it is explained that the charge accumulated in the fourth capacitor C4 is defined so that the potential of the second smoothing capacitor C2 becomes the VCC potential, it is not limited to this. For example as described in the third embodiment, the PREC signal may be newly added to control each of the switch devices SW1 to SW4 so as to recharge the second smoothing capacitor C2 to the VCC potential. Specifically, after generating a short-out between the second smoothing capacitor C2 and boosting capacitor C4, the third switching device SW3 and forth switching device SW4 can be OFF state and second switching device SW2 can be ON state.

Fifth Embodiment

Figure 16:
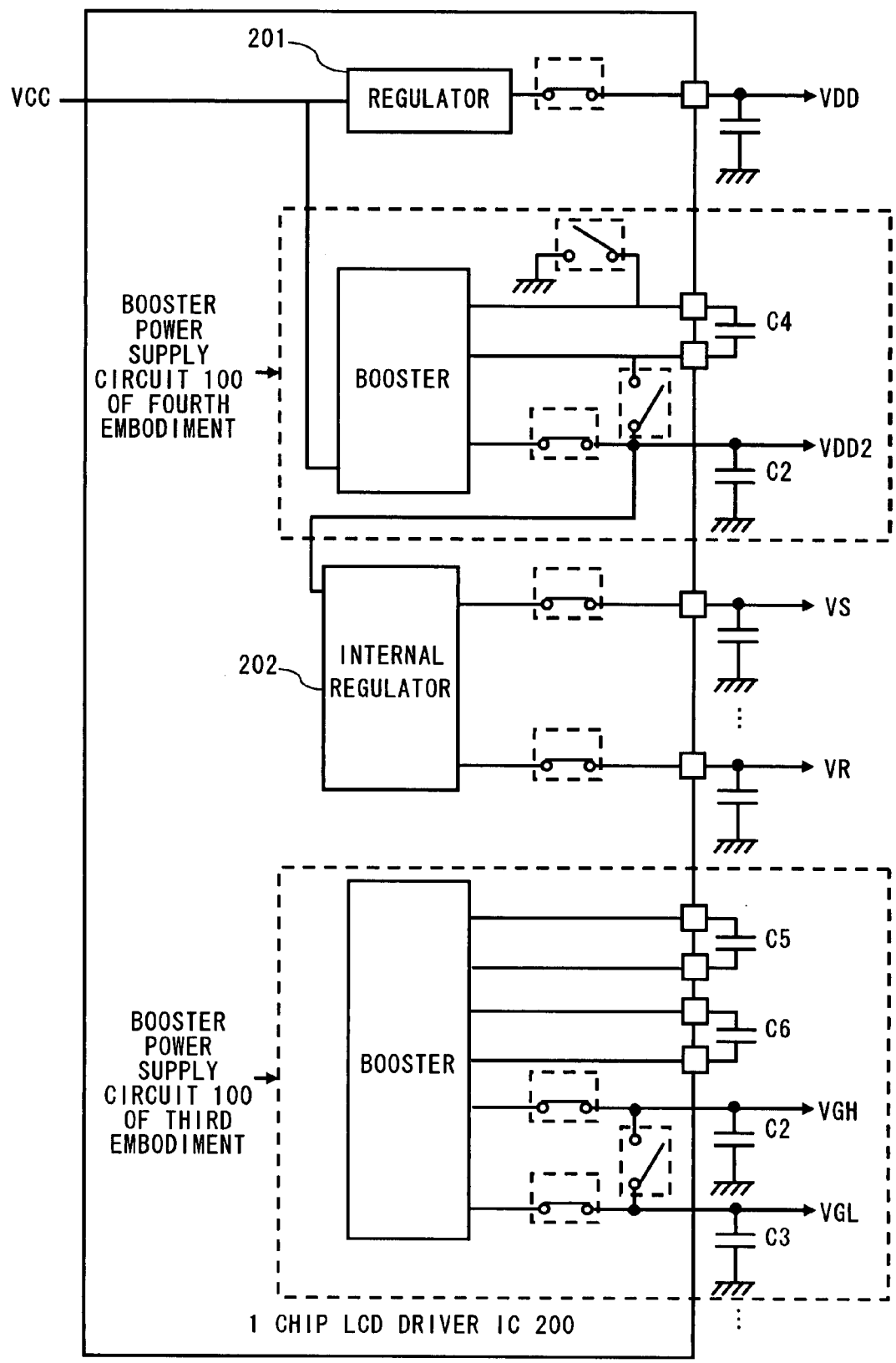
FIG. 16 is a view showing the configuration of a driver IC according to a fifth embodiment of the present invention.
Figure 17:
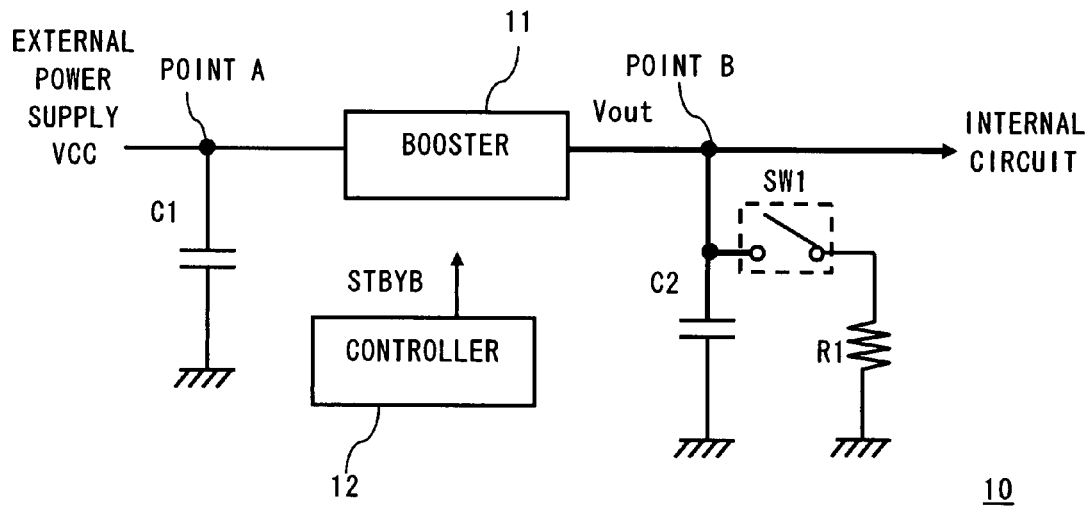
FIG. 17 is a view showing the configuration of a conventional booster power supply circuit.
Figure 18:
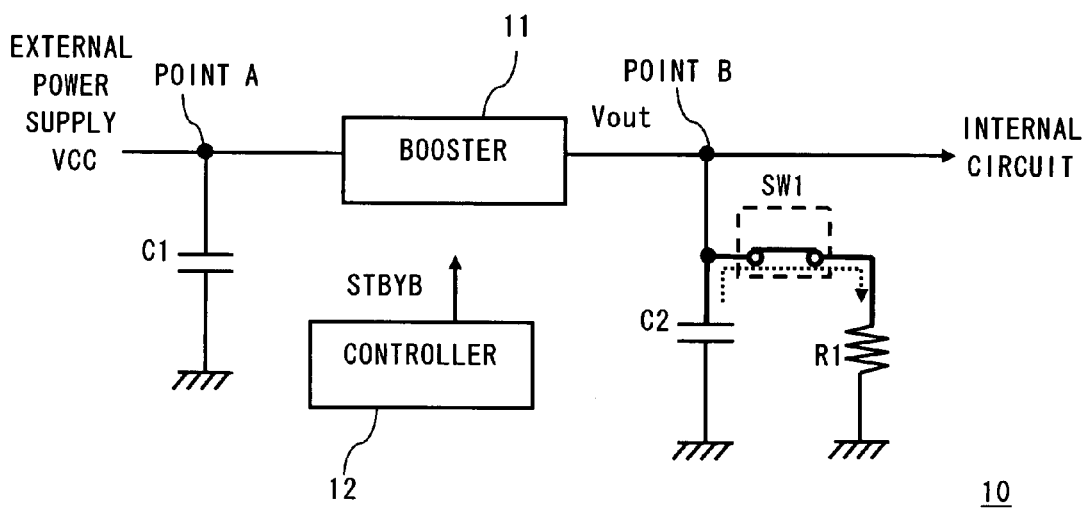
FIG. 18 is a view showing the configuration of a conventional booster power supply circuit.
Figure 19:
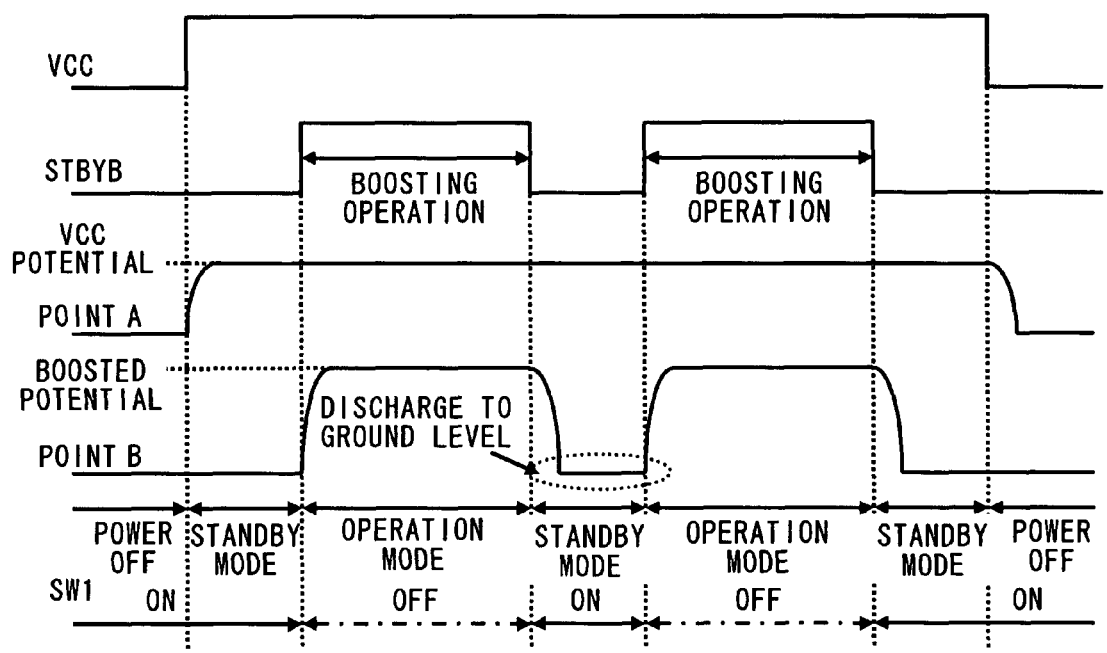
FIG. 19 is a view showing an operation output waveform of a conventional booster power supply circuit.
Figure 20:
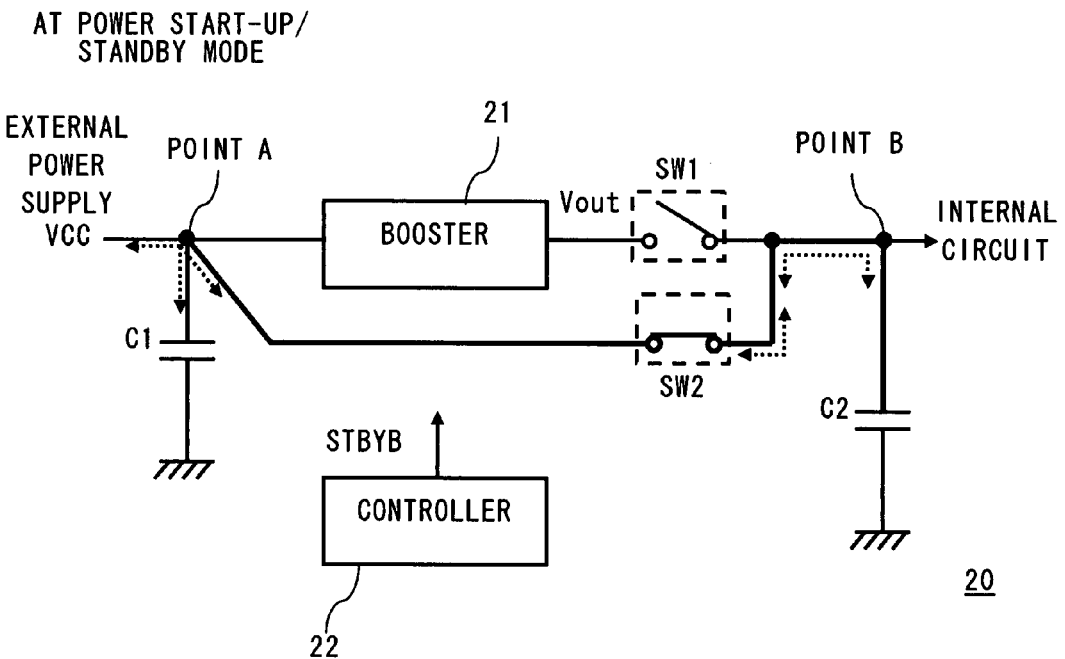
FIG. 20 is a view showing the configuration of a conventional booster power supply circuit.
Figure 21:
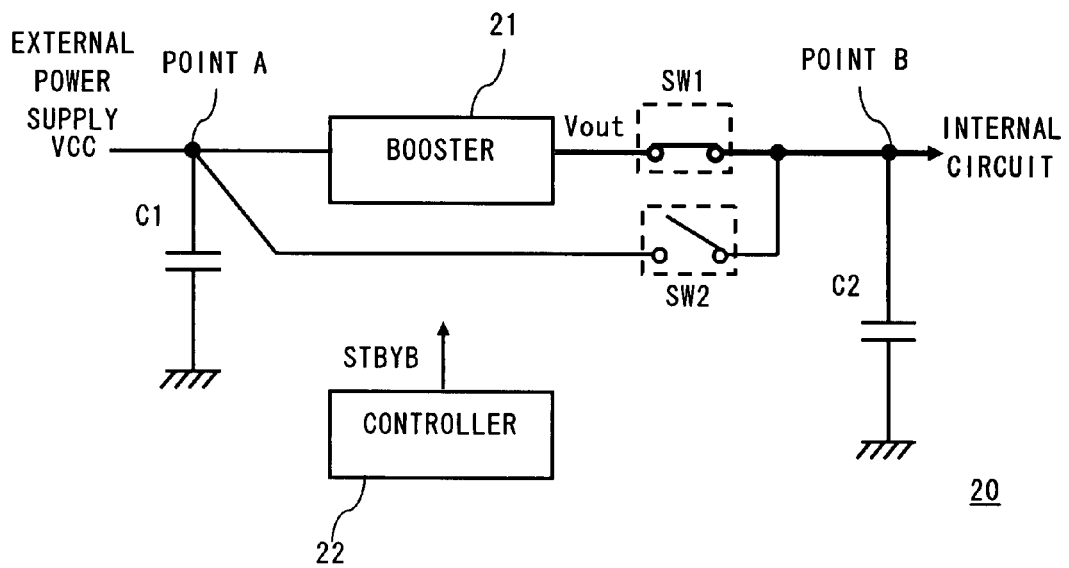
FIG. 21 is a view showing the configuration of a conventional booster power supply circuit.
Figure 22:
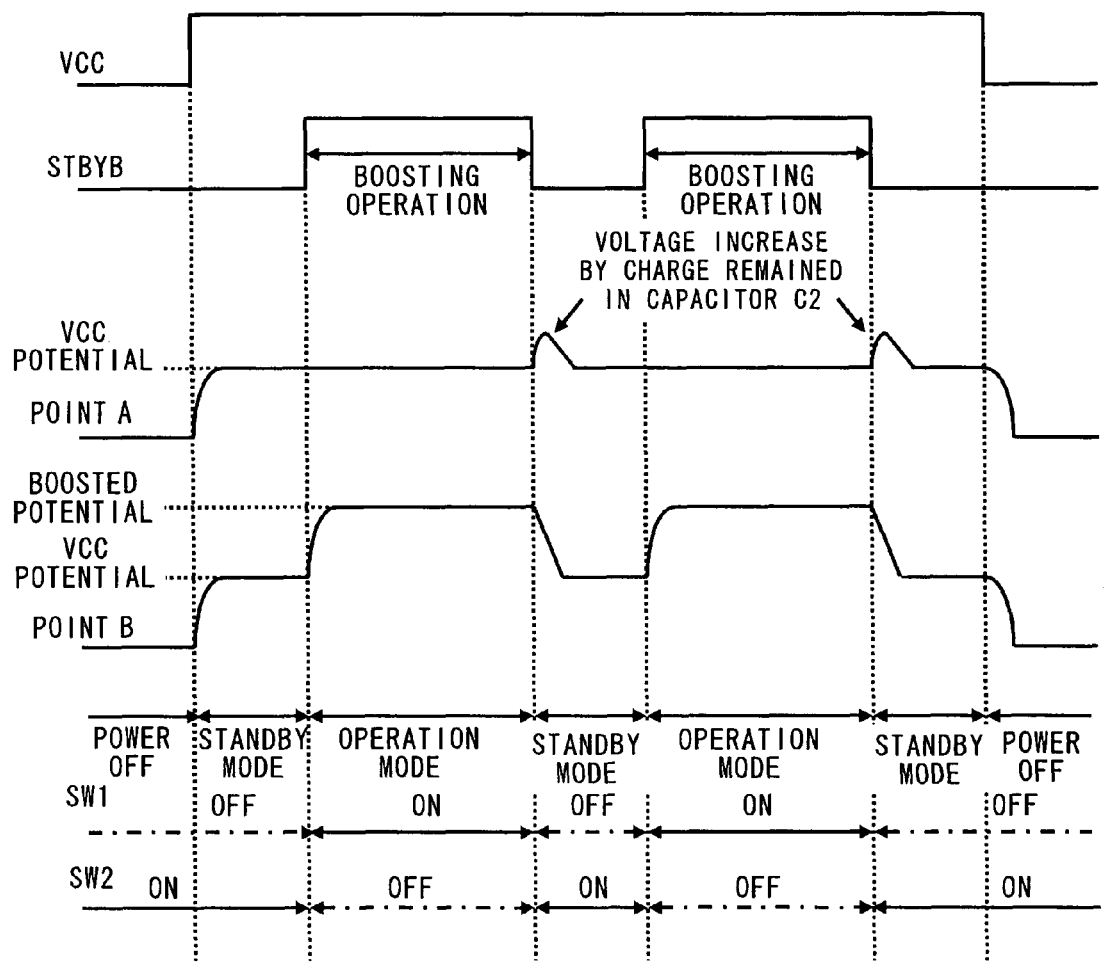
FIG. 22 is a view showing an operation output waveform of a conventional booster power supply circuit.

A driver IC according to a fifth embodiment of the present invention is described hereinafter in detail with reference to FIG. 16. FIG. 16 is a view showing the configuration of a driver IC 200 of this embodiment. The driver IC 200 of this embodiment is a driver IC incorporating the booster power supply circuit 100 of the first to fourth embodiments. In this embodiment, a one chip LCD driver IC including a built-in power supply having two of the booster 100 according to the third and fourth embodiments is described as an example.

As shown in FIG. 16, the driver IC 200 of this embodiment includes a regulator 201, internal regulator 202 and two booster power supply circuits 100. The driver IC 200 includes a built-in driving circuit for gate lines of a liquid crystal display. One of the two booster power supply circuit 100 mounted in the driver IC 200 is the one described in the third embodiment for generating a positive voltage VGH and a negative voltage VGL as power supplies supplied to the gate lines of the liquid crystal display. Further, another of the two booster power supply circuit 100 is the one described in the fourth embodiment for generating a power supply VDD2 for the internal irregulator 202. Note that in FIG. 16, boosting capacitors C5 and C6 are illustrated in the booster power supply circuit 100 of the third embodiment. The boosting capacitors C5 and C6 are provided inside the booster 101 for carrying out a boosting operation.

VCC is an external power supply and the VDD2 is a power supply for the internal regulator 202 generated by the booster power supply circuit 100 of the fourth embodiment. Additionally, the positive voltage VGH and negative voltage VGL are power supplies for gate lines generated by the booster power supply circuit 100 of the third embodiment. As the power supply is applied to the LCD panel, capacities of each smoothing capacitors need to be designed so that the potentials of the second smoothing capacitor C2 and third smoothing capacitor C3 fall to a ground potential when canceling out charges in the standby mode. Note that for the booster power supply circuit for generating the power supply VDD2 for the internal irregulator 202, the booster power supply circuit of the first or second embodiment can be used.

The driver IC configured in this way does not discharge all charge when discharging charge in a smoothing capacitor but retains a certain charge in the standby mode as described in the foregoing. Therefore, the startup time of the booster transited again in the operation mode can be reduced. Furthermore, the potential of the external power supply does not increase, thereby not creating a possibility to destroy devices.

As described in the foregoing, according to the present invention, all the charge is not discharged when discharging the charge in the second smoothing capacitor C2 on the output side of the booster 101 in the standby mode so that the second smoothing capacitor C2 retains a certain charge. Thus the startup time of the booster changed again to the operation mode can be reduced. Further, it is efficient because the charge in the second smoothing capacitor C2 will not be wastefully discharged. Furthermore, the potential of the external power supply will not increase and the possibility of destroying devices can be reduced. Moreover, the abovementioned configuration can be achieved with a simple configuration and control.

It is apparent that the present invention is not limited to the above embodiment, but may be modified and changed without departing from the scope and spirit of the invention.

What is claimed is:

1. A booster power supply circuit comprising:
a booster which boosts an input voltage to output a boosted voltage for applying said boosted voltage to a first smoothing capacitor; and
a controller which controls a transfer destination and an amount of transfer of a charge in the first smoothing capacitor at a transition from an operation mode to a standby mode,
a first switching element which outputs said boosted voltage to a node coupled to said first smoothing capacitor;
a second switching element which connects said node with the input of said booster; and
a third switching element which connects said node to a first power supply via a resistance element,
wherein the controller turns the first switching element to an OFF state, the second switching element to an OFF state and the third switching element to an ON state at a first timing transitioning from the operation mode to the standby mode, and the second switching element to an ON state and the third switching element to an OFF state at a second timing, the second timing being a predetermined time passed from the first timing.

2. The booster power supply circuit according to claim 1, wherein the third switching element is connected to a ground potential.

3. The booster power supply circuit according to claim 1, further comprising a comparator comparing the input of the booster with a node coupled to an output side of the booster and outputting a comparison signal,
wherein the controller controls a transfer destination and an amount of transfer of a charge in the first smoothing capacitor according to the comparison signal.

4. The booster power supply circuit according to claim 3, wherein the comparator connects said node to the input of said booster when a potential of the input of the booster is greater than a potential of said node, and
the comparator connects said node to a ground potential when the potential of the input of the booster is less than the potential of said node.

5. The booster power supply circuit according to claim 1, wherein the booster comprises a positive voltage output for connecting said first smoothing capacitor and a negative voltage output and a negative voltage output for connecting a second smoothing capacitor,
wherein said booster power supply circuit includes a fourth switching element connecting the first smoothing capacitor and the second smoothing capacitor.

6. The booster power supply circuit according to claim 5, wherein the fourth switching element has an ON state at the first timing transitioning from the operation mode to the standby mode, and at the same time the fourth switching element is in an OFF state after a predetermined time has passed, the first smoothing capacitor is connected to the input of said booster.

7. The booster power supply circuit according to claim 1, wherein the booster includes a boosting capacitor, and
the charge in the first smoothing capacitor is moved by connecting the first smoothing capacitor with the boosting capacitor.

8. The power supply voltage circuit according to claim 6, wherein at the first timing transiting from the operation mode to the standby mode, the first smoothing capacitor is connected with the boosting capacitor.

9. A driver IC having a booster power supply circuit according to claim 1.

10. A method, comprising:
applying a voltage outputted from an external power supply to a booster in an operation mode;
outputting a boosted voltage from said booster while smoothing said boosted voltage by a smoothing capacitor;
controlling a transfer destination and an amount of transfer of a charge in the smoothing capacitor at a switch from the operation mode to a standby mode;
outputting, by a first switching element, said boosted voltage to a node coupled to said smoothing capacitor;
connecting, by a second switching element, said node with the input of said booster; and
connecting, by a third switching element, said node to a first power supply via a resistance element,
wherein the controlling further comprises turning the first switching element to an OFF state, the second switching element to an OFF state and the third switching element to an ON state at a first timing transitioning from the operation mode to the standby mode, and the second switching element to an ON state and the third switching element to an OFF state at a second timing, the second timing being a predetermined time passed from the first timing.

11. The method according to claim 10, further comprising:
connecting the smoothing capacitor to the first power supply at the first timing transiting from the operation mode to the standby mode; and
connecting the smoothing capacitor to a second power supply at a second timing, the second timing being the timing a predetermined time has passed from the first timing.

12. The method according to claim 11, further comprising:
connecting an electrode connected to an output side of the booster of the smoothing capacitor to a ground potential at the first timing; and
connecting the electrode connected to an output side of the booster of the smoothing capacitor to the external power supply at the second timing.

13. The method according to claim 11, further comprising:
connecting the electrode connected to the output side of the booster of the smoothing capacitor to an inversed potential to a potential of an electrode of the smoothing capacitor at the first timing; and
connecting the electrode connected to the output side of the booster of the smoothing capacitor to the external power supply at the second timing.

14. The method according to claim 10, further comprising:
comparing a potential of an input part of the booster with the electrode connected to the output side of the booster of the smoothing capacitor; and
controlling a transfer destination and an amount of transfer of a charge in the smoothing capacitor according to a comparison result.

15. A booster power supply circuit, comprising:
a booster which includes an input receiving an input signal and a first output outputting a signal with a boosted potential of the input signal, said input signal being provided for connecting to a first capacitor;
a first switch receiving the output signal from the booster, the first switch coupled between said first output and a first node to selectively provide the output signal from the first output to the first node, said first node being provided for connecting to a second capacitor; and
a second switch coupled between said input and said first node to selectively provide the input signal from said input to said first node;
a third switch coupled between said first node and a line to connect said node to a first power source via a resistance element; and
a controller that turns the first switching element to an OFF state, the second switching element to an OFF state and the third switching element to an ON state at a first timing transitioning from the operation mode to the standby mode, and the second switching element to an ON state and the third switching element to an OFF state at a second timing, the second timing being a predetermined time passed from the first timing.

16. The booster power supply circuit as claimed in claim 15, further comprising:
a comparator receiving a potential of said input and a potential of said first node to control said second and third switches.

17. The booster power supply circuit as claimed in claim 15, further comprising:
a fourth switch coupled between a second output outputting a voltage complementary to a voltage outputted from said first output and a second node provided for connecting a third capacitor,
wherein the line is coupled to said second node.

18. The booster power supply circuit as claimed in claim 15, further comprising:
a fourth switch and a boosting capacitor coupled between said first node and said line so that a third capacitor, said boosting capacitor, and said fourth switch are connected in series and in that order from said node to said line, electrodes of said boosting capacitor being connected to the booster.

19. The booster power supply circuit as claimed in claim 15, wherein said third switch is controlled to turn ON at a transition from an operation mode to a standby mode.

20. The booster power supply circuit according to claim 1, wherein the controller limits an increase of the input voltage supplied to the booster when charging and recharging the first smoothing capacitor during the transition from an operation mode to the standby mode, and
wherein the booster boosts the input voltage during the operation mode and does not boost the input voltage during the standby mode.

* * * * *